US011853491B1

(12) United States Patent
Huang et al.

(10) Patent No.: US 11,853,491 B1
(45) Date of Patent: Dec. 26, 2023

(54) SYSTEMS AND METHODS TO TRANSITION BETWEEN POINTING TECHNIQUES

(71) Applicants: HUAWEI TECHNOLOGIES CANADA CO., LTD., Kanata (CA); Daniel John Vogel, Waterloo (CA)

(72) Inventors: Da-Yuan Huang, Kanata (CA); Che Yan, Kanata (CA); Linghao Du, Kanata (CA); Wei Li, Kanata (CA); Daniel John Vogel, Waterloo (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 18/095,615

(22) Filed: Jan. 11, 2023

(51) Int. Cl.
*G06F 3/038* (2013.01)
*G06F 3/044* (2006.01)
*G06F 3/0354* (2013.01)

(52) U.S. Cl.
CPC .......... *G06F 3/038* (2013.01); *G06F 3/03543* (2013.01); *G06F 3/044* (2013.01)

(58) Field of Classification Search
None
See application file for complete search history.

(56) References Cited

U.S. PATENT DOCUMENTS

| 6,323,846 | B1 * | 11/2001 | Westerman | ........... | G06F 3/0235 |
| | | | | | 345/173 |
| 10,613,666 | B2 | 4/2020 | Bushnell et al. | | |
| 2018/0018057 | A1 * | 1/2018 | Bushnell | ............... | G06F 3/0412 |

OTHER PUBLICATIONS

Dam, "Post-WIMP User Interfaces", Communications of the ACM, 40(2), pp. 63-67, Feb. 1997.
Shi et al., "Ready, Steady, Touch!—Sensing Physical Contact with a Finger-Mounted IMU", Proceedings of the ACM on Interactive, Mobile, Wearable and Ubiquitous Technologies, vol. 4, Issue 2, Article No. 59, pp. 1-25, Jun. 2020.
Ogata et al., "FlashTouch: Touchscreen Communication Combining Light and Touch", SIGGRAPH 2015 Emerging Technologies, ACM 978-1-4503-3635-2/15/08, Aug. 2015.
Xiao et al., "LumiTrack: Lumitrack: Low Cost, High Precision, High Speed Tracking with Projected m-Sequences", UIST'13, ACM 978-1-4503-2268-3/13/10, Oct. 2013.
Kim et al., "AtaTouch: Robust Finger Pinch Detection for a VR Controller Using RF Return Loss", Proceedings of the 2021 CHI Conference on Human Factors in Computing Systems. Association for Computing Machinery, Article 11, 1-9. DOI:https://doi.org/10.1145/3411764.3445442, May 2021.

(Continued)

*Primary Examiner* — Stephen T. Reed

(57) ABSTRACT

A touch display device (TDD) configured to function with a pointing device (PD), and a method of operating the TDD. The TDD has a processor that automatically determines if the PD is in contact with a touch display (TD) of the TDD or with a surface distinct from the TD. When the PD is in contact with the TD, a toggling signal from the PD may be received at the processor to toggle from a first input mode where a tip of the PD overlaps a visual element displayed on the TD, to a second input mode with the tip of the PD is spaced apart from the displayed visual element. When the PD is in contact with the distinct surface, the processor automatically selects a third input mode where a position of the PD on the distinct surface is reproduced as a position the sign on the TD.

20 Claims, 19 Drawing Sheets

(56) References Cited

OTHER PUBLICATIONS

Seol et al., "Finger and stylus discrimination scheme based on capacitive touch screen panel and support vector machine classifier", Jpn. J. Appl. Phys. 58, 074501, DOI:https://doi.org/10.7567/1347-4065/ab2672, Jun. 2019.
Romat et al., "Flashpen: A High-Fidelity and High-Precision Multi-Surface Pen for Virtual Reality", In 2021 IEEE Virtual Reality and 3D User Interfaces (VR), 306-315. DOI:https://doi.org/10.1109/VR50410.2021.00053, 2021.
Ahuja et al., "TouchPose: Hand Pose Prediction, Depth Estimation, and Touch Classification from Capacitive Images", The 34th Annual ACM Symposium on User Interface Software and Technology (UIST '21). Association for Computing Machinery, New York, NY, USA, 997-1009. DOI:https://doi.org/10.1145/3472749.3474801, Oct. 2021.
Hinckley et al., "Sensing Techniques for Tablet+stylus Interaction", Proceedings of the 27th annual ACM symposium on User interface software and technology (UIST '14). Association for Computing Machinery, New York, NY, USA, 605-614. DOI:https://doi.org/10.1145/2642918.2647379, Oct. 2014.
Hasan et al., "A—Coord Input Coordinating Auxiliary Input Streams for Augmenting Contextual Pen-Based Interactions", Session: Pen + Touch, CHI 2012, Austin, Texas, USA, ACM 978-1-4503-1015-4/12/05, May 5-10, 2012.
Ogata et al., "FlashTouch Data Communication through Touchscreens", Session: Touch Interaction, CHI 2013: Changing Perspectives, Paris, France, ACM 978-1-4503-1899-0/13/04, Apr. 27-May 2, 2013.
Song et al., "Grips and Gestures on a Multi-Touch Pen", CHI 2011, Session: Flexible Grips & Gestures, Vancouver, BC, Canada, ACM 978-1-4503-0267-8/11/05, May 7-12, 2011.
Matulic et al., "PenSight Enhanced Interaction with a Pen-Top Camera" CHI 2020, Honolulu, HI, USA, ACM ISBN 978-1-4503-6708-0/20/04, Apr. 25-30, 2020.
Cami et al., "Unimanual Pen+Touch Input Using Variations of Precision Grip Postures" UIST 2018, Berlin, Germany, Session 15: ISBN 978-1-4503-5948-1/18/10, Touch Interaction, Oct. 14-17, 2018.

* cited by examiner

SYSTEMS AND METHODS TO TRANSITION BETWEEN POINTING TECHNIQUES

CROSS-REFERENCE TO RELATED APPLICATIONS

This is the first application filed for the present invention.

TECHNICAL FIELD

This invention pertains generally to computer interfaces and in particular to methods and systems to switch from one interface mode to another.

BACKGROUND

Today's versatile touchscreen (touch display) devices may offer multiple modes of operation where information (e.g., drawings, traces, soft buttons, pull-down menus, characters, etc.) displayed on the touch display can be generated, selected, interacted with, or modified by direct physical interaction with the touch display, or via a keyboard coupled to the touch display, or via a pointing device (e.g., a mouse) coupled to the touch display. Such touchscreen device may have interchangeable operation modes such as, for example, a tablet mode or a laptop mode.

Recently available dual display laptops (DDLs), which have two touch displays, have been gaining popularity. Users of DDLs may wish to use more than one pointing devices to interact with one of the two touch displays, the other of the two touch displays, or both touch displays. Such pointing devices may include a stylus (pen), a mouse, a user's finger, etc.

At present, it is often difficult for users of touch display devices (DDLs, laptops, tablets, mobile communication devices, etc.) to easily use, or change between, the different input modes available for a particular touch display device, or to switch between input devices when the input mode changes or when a particular application is best suited for a specific pointing device.

Therefore, improvements in user interaction with touch display devices is desirable.

This background information is provided to reveal information believed by the applicant to be of possible relevance to the present invention. No admission is necessarily intended, nor should be construed, that any of the preceding information constitutes prior art against the present invention.

SUMMARY

Embodiments of the present disclosure allow a user of a touch display device that has multiple input modes to switch between input modes through interactions between the user and a pointing associated with the touch display device and/or an interaction of the pointing device with a surface, which may be the touch display of the touch display device or another surface.

In a first aspect, the present disclosure provides a method of selecting one of a plurality of input modes. Each of the plurality of input modes defines a distinct spatial relationship between a pointing device (PD) and a position of a visual element displayed on a touch display (TD) of a touch display unit (TDU). The TD is coupled to a processor and the TD has an input surface. The method comprises, at the processor: determining if the PD is in physical contact with the input surface of the TD or with a surface distinct from the input surface of the TD. When the PD is in contact with the input surface of the TD, the method further comprises, at the processor, obtaining a toggling signal to toggle from a first mode to a second mode. The first mode is one of: an overlap mode where a contact region between the PD and the input surface of the TD overlaps the visual element; and a spaced-apart mode where the visual element is spaced apart from the contact region and where the contact region and the visual element are non-overlapping. The second mode is the other of the overlap mode and the spaced-apart mode. The method further comprises, when the PD is in physical contact with the surface distinct from the input surface of the TD, selecting a third mode where a position and a movement of the PD on the surface distinct from the input surface of the TD is reproduced as a position and a movement of the visual element on the TD.

In some embodiments, determining if the PD is in physical contact with the input surface of the TD or with the surface distinct from the input surface of the TD comprises, at least one of: obtaining a TD contact signal from the TD; obtaining the TD contact signal device and obtaining a PD contact signal from the PD; and obtaining the PD contact signal in absence of the TD contact signal.

In some embodiments, the TD is a capacitive TD and is configured to generate a TD contact signal when the PD is in contact with the input surface of the TD, and determining the PD is in physical contact with the input surface of the TDU comprises the processor obtaining the TDU signal.

In some embodiments, the PD has a sensor configured to generate a PD contact signal when the PD is in contact with a surface and, the action of determining the PD is in physical contact with the surface distinct from the input surface of the TD comprises the processor obtaining the PD contact signal in absence of the TDU signal. In some embodiments, the sensor is a force sensor configured to generate the PD contact signal when the PD applies a force to the input surface of the TD or to the surface distinct from the input surface of the TD.

In some embodiments, obtaining the toggling signal comprises obtaining the toggling signal from the PD. In some embodiments, the PD generates the toggling signal in accordance with a user interaction with the PD. In some embodiments, the PD includes an electromechanical switch, and the user interaction with the PD includes a switching action to activate the electromechanical switch. In some embodiments, the PD includes an inertial measurement unit, and the user interaction with the PD includes a movement action of the pointing unit to activate the inertial measurement unit.

In some embodiments, the TD is a first TD, the TDU comprises a second TD, and when in the spaced apart mode, the visual element is on the first TD and the contact region is on the second TD. When the TDU is in the spaced apart mode, the second TD may be configured to display a trackpad on the second TDU, and the position and the movement of the PD on the track pad is reproduced in the position and the movement of the visual element on the first TD.

In some embodiments, the visual element may include at least one of a pixel, a group of pixels, a cursor, an icon, an arrow, a soft button, an image and a portion of a trace.

In a second aspect of the present disclosure, there is provided, a system that comprises: a processing unit; and a touch display (TD) having an input surface and being coupled to the processing unit. The system is configured to operate in a plurality of input modes each of which defining a distinct spatial relationship between a pointing device (PD) coupled to the system and a visual element displayed on the TD. The processing unit is configured to: display the visual element on the TD, obtain a TD contact signal from the TD when the PD is in physical contact with the input surface of the TD, obtain a PD signal from the PD when the PD is in physical contact with a surface distinct from the input surface of the TD, determine the PD is in physical contact with the input surface of the TD when the TD contact signal is obtained, and determine the PD is contact with the surface distinct from the input surface of the TD when the PD signal is obtained in absence of the TD contact signal. The processing unit is configured to, when the PD is in physical contact with the input surface of the TD: obtain a toggling signal from the PD to toggle from a first mode to a second mode. The first mode is one of: an overlap mode where a contact region between the PD and the input surface of the TDU overlaps the visual element; and a spaced apart mode where the visual element is spaced apart from the contact region and where the contact region and the visual element displayed on the TDU are non-overlapping, the second mode being the other of the overlap mode and the spaced apart mode. The processing unit is configured to, when the PD is in physical contact with the surface distinct from the input surface of the TD: select a third mode where a position and a movement of the PD on the surface distinct from the input surface of the TD is reproduced in a position and a movement of the visual element on the TDU.

In some embodiments, the TD is a capacitive TD and is configured to generate the TD contact signal when the PD is in contact with the input surface of the TD, and the processing unit is configured to determine the PD is in physical contact with the input surface of the TD when the processing unit obtains the TD contact signal. The system may comprise the PD and the PD may comprise a sensor configured to generate a PD contact signal when the PD is in contact with the input surface of the TD or with the surface distinct from the input surface of the TD. The processing unit may be configured to determine the PD is in physical contact with the surface distinct from the input surface of the TD when the processor obtains the PD contact signal in absence of the TD contact signal. The sensor may be a force sensor configured to generate the PD contact signal when the PD applies a force to the input surface of the TD or with the surface distinct from the input surface of the TD.

In some embodiments, the PD may be configured to generate the toggling signal in accordance with a user interaction with the PD. In some embodiments, the PD may include an electromechanical switch, and the user interaction with the PD may include a switching action to activate the electromechanical switch.

In some embodiments, the PD may include an inertial measurement unit, and the user interaction with the PD may include a movement action of the pointing unit to activate the inertial measurement unit.

In some embodiments, the visual element may include at least one of: a pixel, a group of pixels, a cursor, an icon, an arrow, a soft button, an image and a portion of a trace.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

It will be noted that throughout the appended drawings, like features may be identified by like reference numerals.

DETAILED DESCRIPTION

In the context of the present disclosure, a touch display unit (TDU) is an apparatus that has one touch display or more than one touch display. Examples of TDUs include, for example, dual display laptops, convertible laptops, tablets, mobile communication devices, digital whiteboards, foldable phones, interconnected devices such as a laptop connected to laptop or a personal computer connected to a touch display. TDUs may also include other devices or systems having one or more than one touch display with multiple input modes. The multiple input modes may be modes where a pointing device such as, for example, a pen (a stylus), a mouse or a user's finger may be used to cooperate with the TDU to generate an input for the TDU. The pointing device may be an active (powered) pointing device or a passive pointing device. An active pointing device is a device configured to generate a wireline signal or a wireless signal (e.g., a Bluetooth™ signal) to be received by the TDU for the TDU (processor circuitry thereof) to perform a task or an action. Active pointing devices may also include pointing devices configured to receive wireline or wireless signals from the TDU. Also, in the context of the present disclosure, a display may be a touch display or a display without touch functionalities. A touch display may be a capacitive touch display, an electromagnetic touch display, a pressure sensitive touch display, etc.

Embodiments of the present invention relate to problems encountered by users of TDUs configured to operate under different pointing techniques/modes/interfaces.

Figure 1:
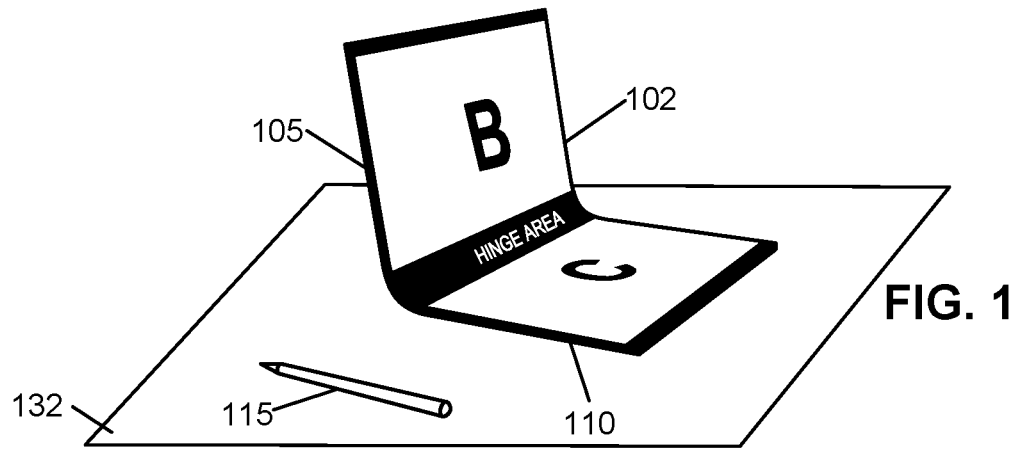
FIG. 1 shows a perspective view of an embodiment of a dual display laptop (DDL) and a stylus in accordance with the present disclosure.

TDUs with more than one touch display (TD) are known in the art and they include dual display laptops (DDLs). FIG. 1 shows a perspective view of an embodiment of a DDL 102 having a touch display (TD) 105 and a TD 110 in accordance with the present disclosure. Also shown in FIG. 1 is a stylus 115 that can be used as an input device (pointing device) for the TD 105 or the TD 110. A surface 132 supports the TD 110 and the DDL 102.

The present disclosure provides different input modes for the stylus 115, or any other suitable pointing device, to provide an input to the TD 105 or to the TD 110, by direct interaction of the stylus 115 with the TD 105 or the TD 110 or by indirect interaction of the stylus 115 with the TD 105 or the TD 110. An indirect interaction of the stylus 115 with the TD 105 or the TD 110 includes the stylus 115 interacting with a surface other than a surface of the TD 105 or of the TD 110. An example of an indirect interaction includes the stylus 115 directly interacting with the surface 132 that supports the DDL 102 and the TD 110. The stylus 115 directly interacting with the surface 132 is to be understood as meaning that the stylus 115 being in physical contact with the surface 132 and moving, or not, along the surface 132. An indirect interaction of the stylus with the TD 105 or the TD 110 will typically include the stylus 115 transmitting an input signal to the DDL 102, the input signal containing data representing the interaction of the stylus 115 with the surface 132.

Figure 2:
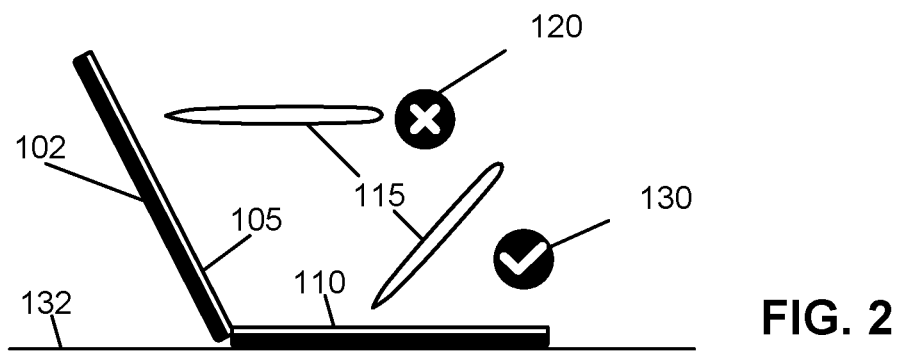
FIG. 2 shows a side view of the DDL and stylus of FIG. 1, in accordance with the present disclosure.

FIG. 2 shows a side view of the DDL 102, the stylus 115, a "X" symbol 120 indicating the stylus 115 may not be suitable or practical for direct input on the TD 105 when the TD 105 is at an angle, without a backing surface. FIG. 2 also shows a "check" symbol 130 indicating the stylus 115 may be suitable for input on the TD 110 when the TD 110 is supported, for example, by the surface 132.

Figure 3:
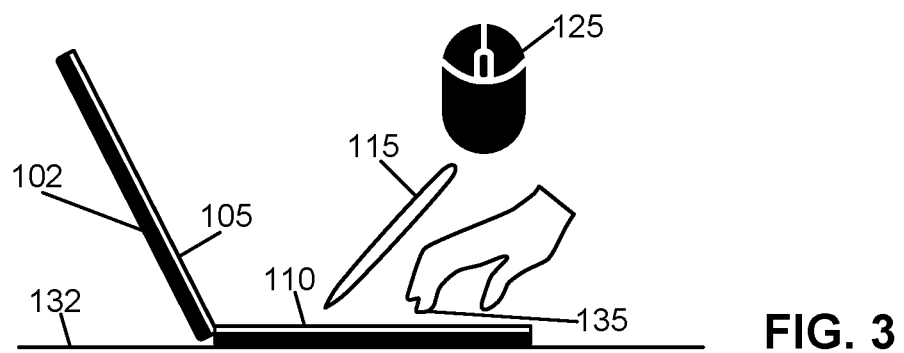
FIG. 3 shows a mouse and a side view of the DDL and stylus of FIG. 1, in accordance with the present disclosure.

FIG. 3 show a side view of the DDL 102 along with the stylus 115, a mouse 125, a finger (hand) 135 and the surface 132. The stylus 115, the mouse 125 and the finger 135 can all be used as input devices for the DDL 102. For example, the stylus 115 or the finger 135 may be used as input devices through direct physical contact with the TD 110 to interact with elements displayed on the TD 110 or to modify material displayed on the TD 110. For example, the stylus 115 or the finger 135 may physically contact the TD 110 to interact directly with elements displayed on the TD 110 or to modify material displayed on the TD 110. The stylus 115 and the finger 135 may also be used as input devices for the TD 105 even though it may be impractical or challenging in absence of backing for the TD 105. The mouse 125 may be used as an input device for the DDL 102 by being coupled to the DDL 102 and by being configured to interact with elements displayed on the TD 105 or the TD 110 according to user actions performed with or on the mouse 125. Examples of such user actions include a user clicking a mouse button and/or moving the mouse 125 along the surface 132.

Figure 4:
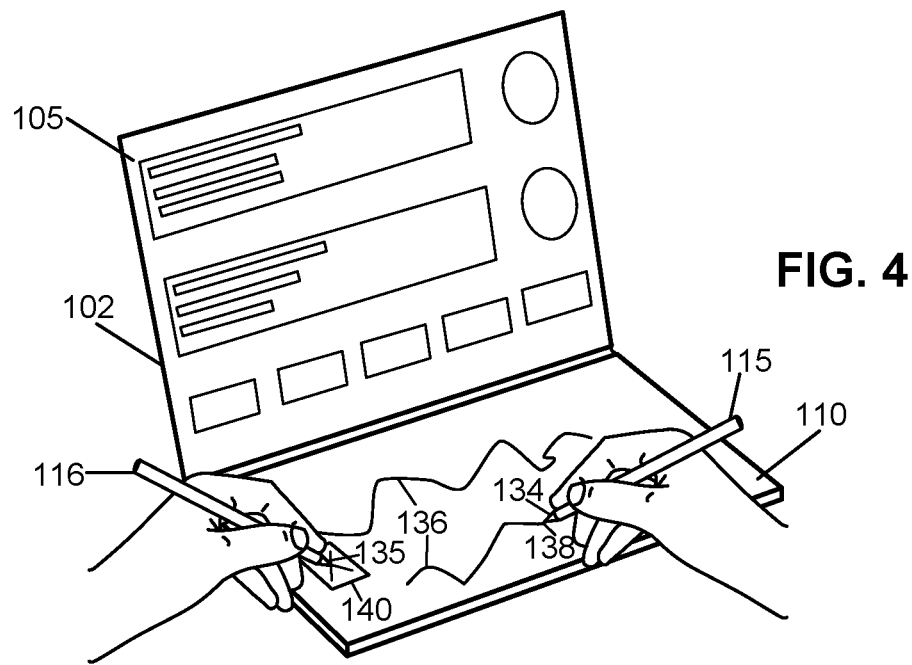
FIG. 4 shows two examples of overlap modes in accordance with the present disclosure.

There may therefore exist several input (interaction) modes between a pointing device and the DDL 102. One of the input modes may be referred to as an on-display direct input mode, which may also be referred to as on-display overlap mode or simply as an overlap mode. FIG. 4 shows an example of the overlap mode where the tip 134 of the stylus 115 is in physical contact with the TD 110 and is moved across the TD 110 to draw traces 136 on the TD 110. A trace 136 or a portion of the trace 136 may be referred to as a visual element. In this mode, the overlap mode, the contact area between the tip 134 and the TD 110 overlaps the portion 138 of a trace 136 (displayed visual element) that is being drawn or modified or interacted with in accordance with the interaction between the tip 134 and the TD 110. FIG. 4 also show another example of the overlap mode where the tip 135 of another stylus 116 overlaps and interacts with a button 140 displayed on the TD 110 to click the button 140. The button 140 may be referred to as a visual element or as a displayed visual element.

Figure 5:
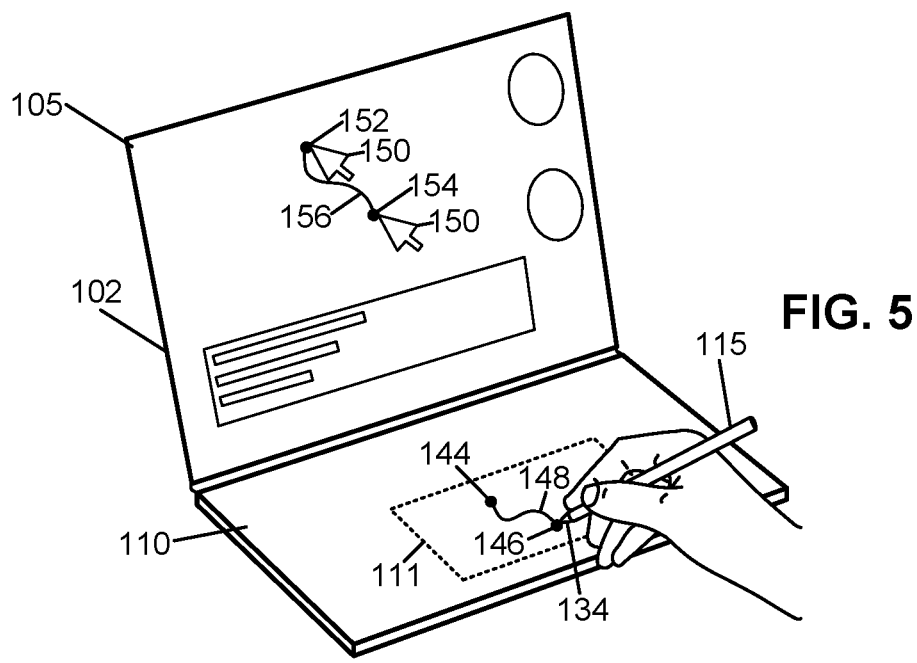
FIG. 5 shows an example of a spaced apart mode in accordance with the present disclosure.

Another, different input mode in accordance with the present disclosure may be referred to as an on-display indirect input mode, which may also be referred to as an on-display spaced-apart mode or simply as a spaced-apart mode. FIG. 5 shows an example of the spaced apart mode where the TD 110 or a portion thereof acts as touchpad for the stylus 115 (or for a finger). In this mode, the tip 134 of the stylus 115 is in physical contact with the TD 110 and a movement of the stylus 115 to change the position of the tip 134 with respect to the TD 110 result in a cursor 150 displayed on the TD 105 to move on the TD 105. As an example, moving the stylus 115 from a position where the tip 134 is at a position 144 on the TD 110 to a position where the tip 134 is at a position 146 on the TD 110, along a path 148 results in a cursor 150 displayed on the TD 105 to move from a position 152 to a position 154, along a path 156.

Alternatively, only a portion 111 of the TD 110 may be used as a touchpad and the remaining portion of the TD 110 may then operate as a TD (or as a display without touch capabilities) albeit smaller than the TD 110. In this input mode, moving the stylus 115 from the position where the tip 134 is at the position 144 on the TD 110 to the position where the tip 134 is at the position 146 on the TD 110, along a path 148, may result in a cursor 150 being displayed on the TD 105 or on the remaining portion of the TD 110 and moving from the position 152 to the position 154, along the path 156. That is, the portion 111 of the TD 110 may be used as a touch pad and the interactions of the stylus 115 with the portion 111 may be mapped to the remaining portion of the TD 110 instead of to the TD 105.

Figure 6:
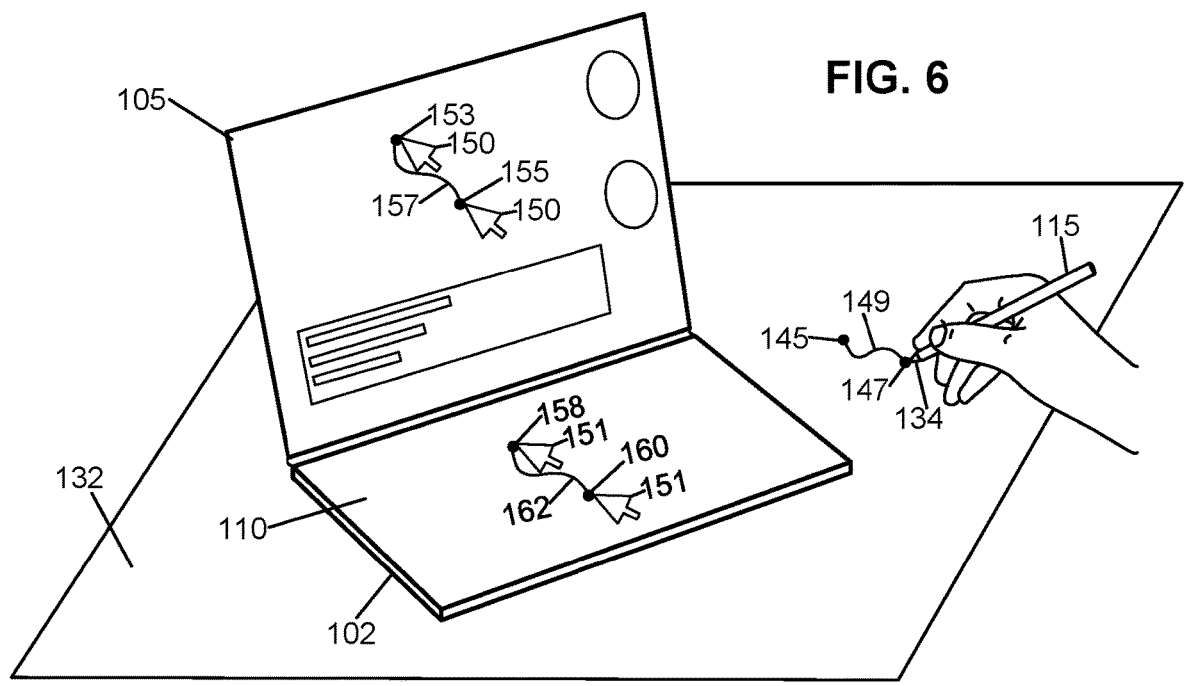
FIG. 6 shows an example of an off-display mode in accordance with the present disclosure.

Yet another, different mode may be referred to as an off-display indirect input mode, which may also be referred to simply as an off-display mode. FIG. 6 shows an example of the off-display mode where the surface 132 acts is an interaction surface. In this mode, the tip 134 of the stylus 115 is in physical contact with the surface 132 and a movement of the stylus 115 to change the position of the tip 134 with respect to the surface 132 results in a cursor 150 displayed on the TD 105 to move on the TD 105. The cursor 150 is another example of a visual element or a displayed visual element. As an example, moving the stylus 115 from a position where the tip 134 is at a position 145 on the surface 132 to a position where the tip 134 is at a position 147 on the surface 132, along a path 149 results in a cursor 150 displayed on the TD 105 to move from a position 153 to a position 155, along a path 157. Alternatively, as another example, moving the stylus 115 from the position where the tip 134 is at the position 145 on the surface 132 to the position where the tip 134 is at the position 147 on the surface 132, along the path 149, may result in a cursor 151 displayed on the TD 110 to move from a position 158 to a position 160, along a path 162.

A user using the DDL 102 and the stylus 115 may want to switch (transition) between input modes as shown in Table 1. Embodiments of the present disclosure provides methods for switching input modes.

TABLE 1

Dual-screen laptop

On-display direct input mode to on-display indirect input mode (FIG. 4 to FIG. 5)
On-display direct input mode to off-display indirect input mode (FIG. 4 to FIG. 6)
Off-display indirect input mode to on-display direct input mode (FIG. 5 to FIG. 4)
Off-display indirect input mode to off-display indirect input mode (FIG. 5 to FIG. 6)
Off-display indirect input mode to on-display direct input mode (FIG. 6 to FIG. 4)
Off-display indirect input mode to on-display indirect input mode (FIG. 6 to FIG. 5)

Some of the input modes like those shown in the embodiments of FIGS. 4-6 may be used with any other suitable TDUs such as, for example, convertible laptops and tablets, as shown in FIGS. 7 to 10.

Figure 7:
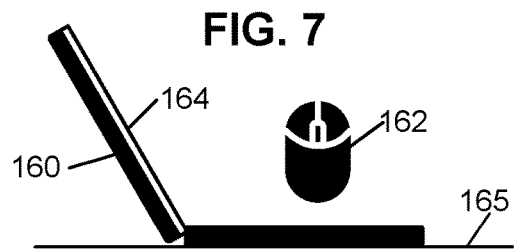
FIG. 7 shows an example of a convertible laptop coupled to a mouse.

FIG. 7 shows a convertible laptop 160 coupled to a mouse 162, which is used as an input device while in contact with a supporting surface such as, for example, the surface 165 supporting the convertible laptop 160, to select information displayed on a TS 164, to modify information displayed on the TS 164, or to provide input data to be displayed by the convertible laptop 160 on the TS 164. Alternatively, a stylus may be used instead of the mouse 162. The input mode shown in FIG. 7 is also an off-display input mode akin to that shown in FIG. 6.

Figure 8:
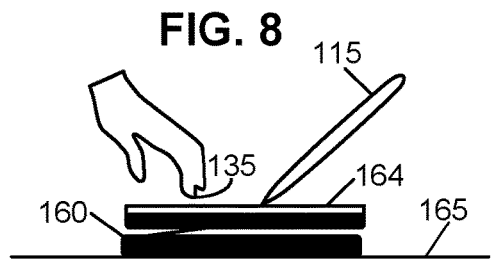
FIG. 8 shows the convertible laptop of FIG. 7 coupled to a stylus and configured to operate as a tablet.

FIG. 8 shows the same convertible laptop 160 configured to operate as a tablet, where the stylus 115 or a finger 135 may be used as an input device to select information displayed on the TS 164, to modify information displayed on the TS 164, or to provide input data to be displayed by the convertible laptop 160 on the TS 164. The input mode shown in FIG. 8 is an overlap mode akin to the input mode shown in FIG. 4.

A user using the convertible laptop 160, the stylus 115 and/or the mouse 162 may want to switch between input modes as shown in Table 2. Embodiments of the present disclosure provides methods to do so.

TABLE 2

Convertible laptop

Off-display input mode with mouse or stylus to on-display direct input mode with stylus or mouse (FIG. 7 to FIG. 8)
On-display direct input mode with stylus or finger to off-display input mode with mouse or stylus (FIG. 8 to FIG. 7)

Figure 9:
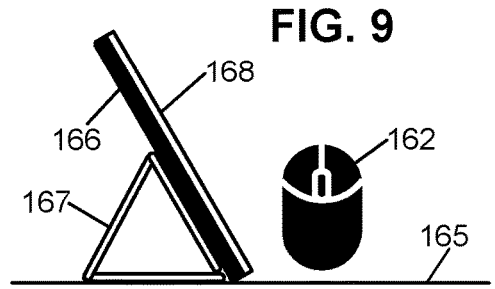
FIG. 9 shows an example of a tablet coupled to a mouse.

FIG. 9 shows a tablet 166 coupled to a mouse 162, which is used as an input device while in contact with a supporting surface such as, for example, the surface 165 supporting the tablet and the tablet prop 167, to select information displayed on a TS 168, to modify information displayed on the TS 168, or to provide input data to the tablet 166 for the tablet 166 to display on the TS 168. Alternatively, a stylus may be used instead of the mouse 162. The input mode shown in FIG. 9 is an off-display input mode akin to that shown in FIG. 6 except that in FIG. 9, the pointing device is a mouse instead of a stylus.

Figure 10:
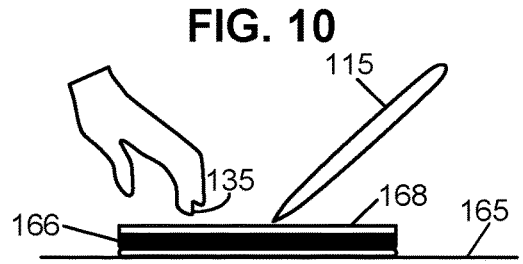
FIG. 10 shows the tablet of FIG. 9 configured to receive input from a fingertip or a stylus.

FIG. 10 shows the same tablet 166 where the stylus 115 or the finger 135 may be used as an input device directly on the TS 168 to select information displayed on the TS 168, to modify information displayed on the TS 168, or to provide input data for the tablet 166 to display on the TS 168. The input mode shown in FIG. 8 is an on-display direct input mode akin to the input mode shown in FIG. 4.

A user using the tablet 166, the stylus 115 and/or the mouse 162 may want to switch between input modes as shown in Table 3. Embodiments of the present disclosure provides methods to do so.

TABLE 3

Tablet

Off-display input mode with mouse or stylus to on-display direct input mode with stylus or finger (FIG. 9 to FIG. 10)
On-display direct input mode with stylus or finger to off-display input mode with mouse or stylus (FIG. 10 to FIG. 9)

Figures 11, 12:
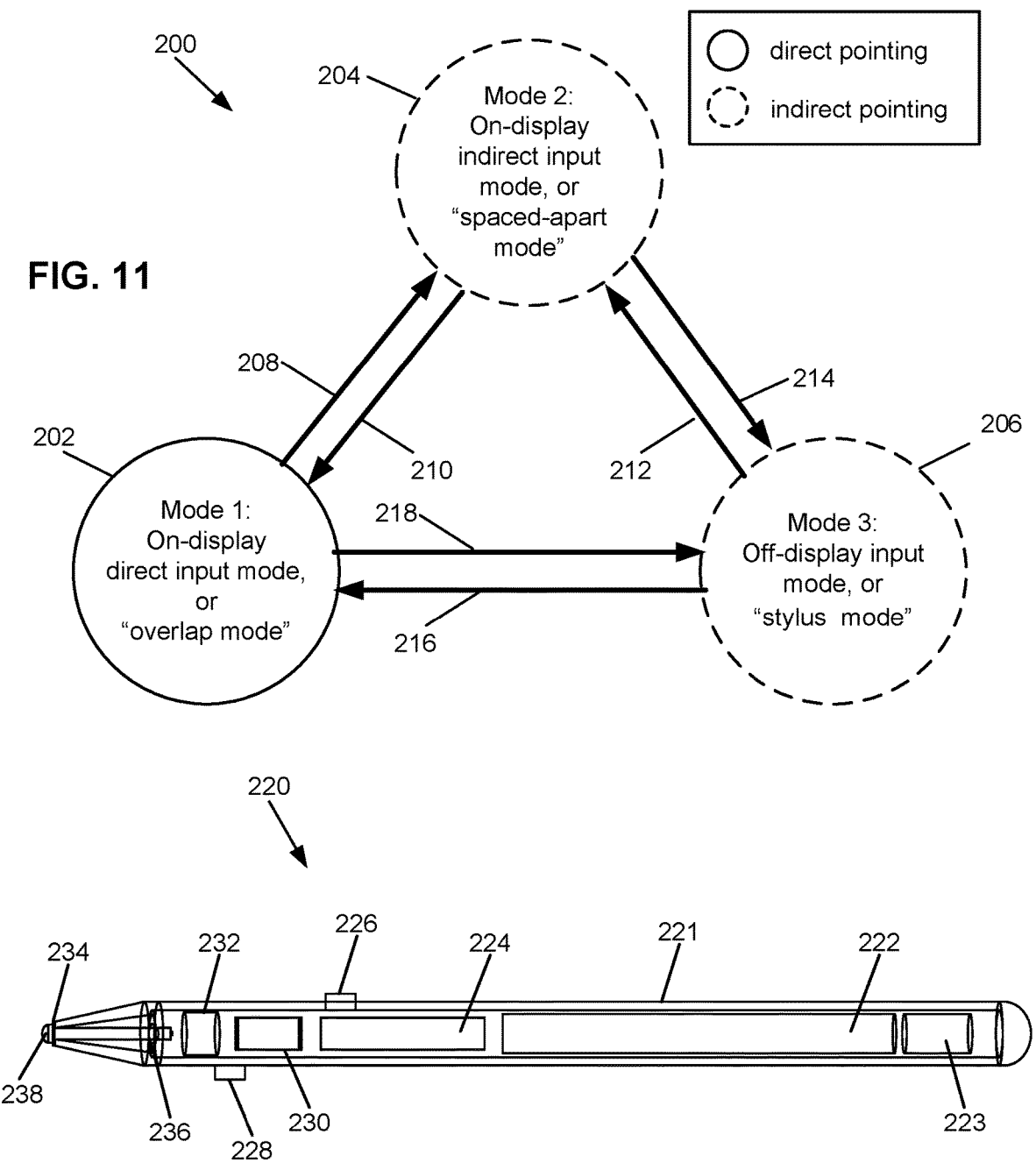
FIG. 11 shows an example of a state diagram showing possible input mode transitions in accordance with the present disclosure.
FIG. 12 shows a cutaway view of an embodiment of a pointing device in accordance with the present disclosure.

Embodiments of TDU transitions between different input modes of a TDU (e.g., a DDL) in accordance with the present disclosure are shown in FIG. 11, which includes a state diagram 200 having three different vertices representing three input modes, and three pairs of transitions edges interconnecting the vertices. The state diagram 200 shows a first input mode 202 (mode 1), which is an on-display direct input mode (an overlap mode), a second input mode 204 (mode 2), which is an on-display indirect input mode (a spaced apart mode), and a third input mode 206 (mode 3), which is an off-display input mode. Edges 208 and 210 represent input mode transitions between mode 1 and mode 2, with the edge 208 being from mode 1 to mode 2 and edge 210 being from mode 2 to mode 1. Edges 212 and 214 represent input mode transitions between mode 2 and mode 3, with the edge 212 being from mode 3 to mode 2 and edge 214 being from mode 2 to mode 3. Edges 216 and 218 represent input mode transitions between mode 3 and mode 1, with the edge 216 being from mode 3 to mode 1 and edge 218 being from mode 1 to mode 3.

In accordance with embodiments of the present disclosure, the ability to change an input mode to a TDU may be provided through user interactions with the TDU (e.g., a DDL) via the pointing device (e.g., a stylus). In some embodiments, the pointing device may be equipped with a power supply such as, for example, a rechargeable or replaceable battery configured to power sensors, detectors, transmitters, receivers or transceivers that may be comprised in the pointing device. In some embodiments, the pointing device may be equipped with one or more actuator (switch) for the user to actuate to cause a predetermined action by the pointing device and/or any TDU coupled to the pointing device.

In some embodiments, the pointing device may be equipped with a sensor configured to sense a movement of pointing device along a pre-determined axis of the pointing device (e.g., in the case of a stylus, the axis defined by the length (or any other dimension) of the stylus). In some embodiments, the pointing device may be equipped with a force sensor force configured to detect a force applied to the pointing device in a direction perpendicular to the length (or any other dimension) of the pointing device. In some embodiments, the pointing device may be equipped with an optical sensor configured to detect movement of the pointing device across the surface with which the pointing device is in physical contact with. In some embodiments, the pointing device may be equipped with an acceleration sensor (inertial measurement unit (IMU)) configured to sense an acceleration of the pointing device along one or more direction. In some embodiments, the pointing device may be equipped with a transmitter or with a transceiver coupled to the sensors and actuators of the pointing device. The transmitter or the transceiver of the pointing device may be configured to couple (connect) to a receiver or to a transceiver of the TDU to exchange signals therebetween.

FIG. 12 shows a cutaway view of an embodiment of a pointing device, a stylus 220, in accordance with the present disclosure. The stylus 220 includes mechanical and electrical components and can therefore be referred to as an electromechanical stylus or as an electromechanical pointing device. The stylus 220 may comprise housing 221, a power supply (e.g., a battery) 222, a communication unit (receiver and/or transmitter and/or transceiver) 223 coupled to the power supply 222, circuitry (e.g., a printed circuit board comprising a processor and a memory) 224 coupled to the communication unit 222, a first switch (actuator) 226 and a second switch (actuator) 228 coupled to the circuitry 224, an acceleration sensor (IMU) 230 coupled to the circuitry, a force sensor 232 coupled to the circuitry 224 and configured to sense/detect a force applied to the tip 234 of the stylus 220 in the direction of the length (e.g., the z-direction) of the stylus 220. The stylus 220 may also comprise a transverse force sensor 236 coupled to the circuitry 224 and configured to detect a force applied to the tip 235 in a direction perpendicular to the length of the stylus 220, and an optical sensor 238 coupled to the circuitry 224 and configured to detect a movement of the tip 234 relative to a surface with which the tip 234 is in contact with. The stylus 220 may also comprise a piezoelectric component coupled to the circuitry 224. The piezoelectric component may be positioned with the stylus 220 such that pressure applied to the housing 221 results into pressure being applied to the piezoelectric component, to generate a piezoelectric signal.

In some embodiments, for a TDU, switching from one input mode to another input mode may include determining if the pointing device is in physical contact with a TD of the TDU or if the pointing device is in physical contact with a surface other than a surface provided by any TD of the TDU. In some embodiments, this may be performed by the TDU when the TDU receives an input signal from the TD with which the pointing device is in physical contact with, or when the TDU receives an input signal from the pointing device indicating the pointing device is in contact with a surface while not receiving, from any TD of the TDU, a signal indicative of the pointing device being in physical contact with any TD of the TDU.

As is known in the art, for a capacitive TD, detecting that the pointing device is in physical contact with the TD of the TDU may be possible regardless of whether the pointing device is a finger, a passive (unpowered) mechanical device, or an active (powered) electromechanical device. For example, determining the pointing device is a finger or a stylus may be based on the surface area of the TD covered by the pointing device (a contact surface area larger than a pre-determined value would be indicative of the pointing device being a finger and a contact surface area being smaller than the pre-determine value would be indicative of the pointing device being a stylus) or by a pressure applied by the pointing device. Whether the pointing device is a finger, a passive mechanical pointing device or an active electromechanical pointing device, the pointing device may produce, in the TDU, an electrical signal or modify an existing electrical signal, which may act as the determining, physical contact factor (criteria). As is further known in the art, TDs and their related TDUs may be configured to discriminate between different pointing devices in accordance with a parameter of the electrical signal produced or modified when the pointing device physically contacts the related TD. In some embodiments, the parameter may be, for example, an intensity of the electrical signal produced or modified, or a frequency of the electrical signal produced or modified. For capacitive TDs, the parameter of the electrical signal may be produced or modified according to a change in a capacitance value of the TD when the pointing device comes in contact with the TD.

Figure 13:
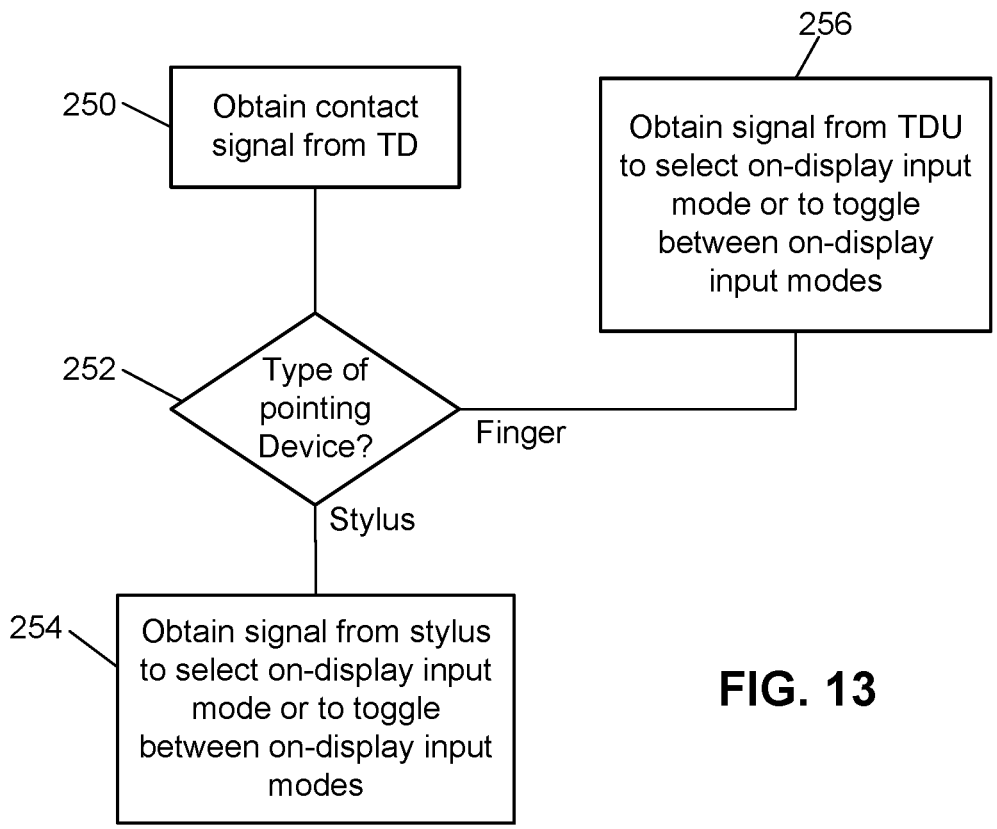
FIG. 13 shows a flowchart of an embodiment of a method in accordance with the present disclosure.

FIG. 13 shows a flowchart of an embodiment of a method in accordance with the present disclosure. At action 250, a processing unit coupled to a TD of a TDU obtains a contact signal indicating that a pointing device has made physical contact with the TD. The processing unit may be comprised in the TDU and include a processor or processor circuitry. The contact signal may be obtained from the TD in response to a change in a physical parameter of the TD. For example, the contact signal may be an electrical signal indicating a change in capacitance of the TD. As another example, the contact signal may be an electrical signal indicating an application of pressure of the TD. As yet another example, the contact signal may be an electrical signal indicating a change in an optical parameter of the TD.

In some embodiments, at action 252, the processing unit may determine if the contact signal obtained from the TD is indicative of skin (e.g., finger skin) making contact with the TD of if the contact signal is indicative of something other than skin making contact with the TD. Alternatively, at action 252, the processing unit may determine if the contact signal is indicative of a stylus making contact with the TD of if the contact signal is indicative of something other than the stylus making contact with the TD. Further, in some embodiments, at action 252, the processing unit may determine if the contact signal is indicative of skin (e.g., finger skin) making contact with the TD of if the contact signal is indicative of a stylus making contact with the TD.

In some embodiments, when the processing unit determines the pointing device is a stylus, the method may proceed to action 254 where the processing unit may obtain a signal from the stylus. In some embodiments, the signal obtained from the stylus may be a toggle signal to toggle from a first on-display input to a second on-display input mode. The first on-display input mode may be the on-display overlap mode and the second on-display input mode may be the on-display spaced-apart mode, or vice-versa. In some embodiments, the signal obtained from the stylus may be a selection signal to select an on-display input mode.

The toggle signal or the selection signal may be obtained from the stylus subsequent an interaction between the stylus and the user of the stylus. A first predetermined interaction may cause a toggling between on-display input modes, a second predetermined interaction may cause a selection of a first on-display input mode, and a third predetermined interaction may cause a selection of a second on-display input mode.

As an example, the interaction may be an actuation of a switch (actuator) on the stylus. A first switch may cause a toggling between the on-display input modes, a second switch may cause a selection of the first predetermined input mode, and a third switch may cause a selection of the second predetermined on-display input mode. In some embodiments, the first pre-determined interaction, the second pre-determined interaction and the third predetermined interaction may be different types of interactions. In some embodiments, there may be a distinct pre-determined interaction for each predetermined on-display input mode.

As another example of interaction, the interaction may be a manipulation of the stylus by the user to accelerate the stylus such that an accelerometer or an IMU comprised in the stylus generates an acceleration signal that causes the stylus to toggle between the on-display input modes (or to select an on-display input mode, or to switch to a desired input mode). As a further example, the manipulation of the stylus by the user may be the user squeezing the stylus to apply pressure on a piezoelectric component comprised in the stylus to cause the piezoelectric component to generate a piezoelectric signal that causes the stylus to toggle between the on-display input modes (or to select an on-display input mode, or to switch to a desired input mode). As an additional example, the manipulation of the stylus may be the user moving the stylus on the TD in accordance with a pre-determined pattern to generate a pattern signal that causes the stylus to toggle between the on-display input modes (or to select an on-display input mode, or to switch to a desired input mode).

As will be understood by the skilled worker, the manipulation of the stylus may be any action that causes a detector or sensor comprised in the stylus to generate a detector or sensor signal than cause the stylus to toggle between the on-display input modes (or to select an on-display input mode, or to switch to a desired input mode).

In some embodiments, the stylus generating a toggle signal may include circuitry of the stylus (pointing device) receiving the detector or sensor signal subsequent a manipulation of the stylus and the circuitry controlling a transmitter or a transceiver of the stylus to provide (e.g., to send, to make available) the toggle signal to the TDU (or to provide the selection signal to the TDU, or to provide the switching signal to the TDU).

In some embodiments, subsequent action 252, the processing unit coupled to the TDU may set itself to operate in a pre-determined on-display input mode. In some embodiments, the pre-determined on-display input mode may be the last on-display input mode in which the TDU operated. For example, if the last time the TDU operated in an on-display input mode, it was in an on-display overlap mode, then the predetermined on-display input mode will be the on-display overlap mode. In other embodiments, the predetermined on-display input mode may be preset and be independent of the input mode the TDU last operated in.

In some embodiments, subsequent action 252, when it has been determined the pointing device is a stylus, the TDU may be configured to display soft selection buttons on the TD for the user to select an on-display input mode.

If, at action 252, the processing unit coupled to the TDU determines that the pointing device is a finger, then the method may proceed to action 256 where the user may interact with the TD or with the TDU to select an on-display input mode, to switch to a desired on-display input mode, or to toggle between on-display input modes. The interaction of the user with the TD or with the TDU may include the user actuating one or more soft buttons displayed on the TD or the user tracing a pre-determined pattern on the TD. When the TDU has a physical keyboard, the interaction of the user with the TDU may include the user actuating one key or a sequence of keys of the keyboard.

Figure 14:
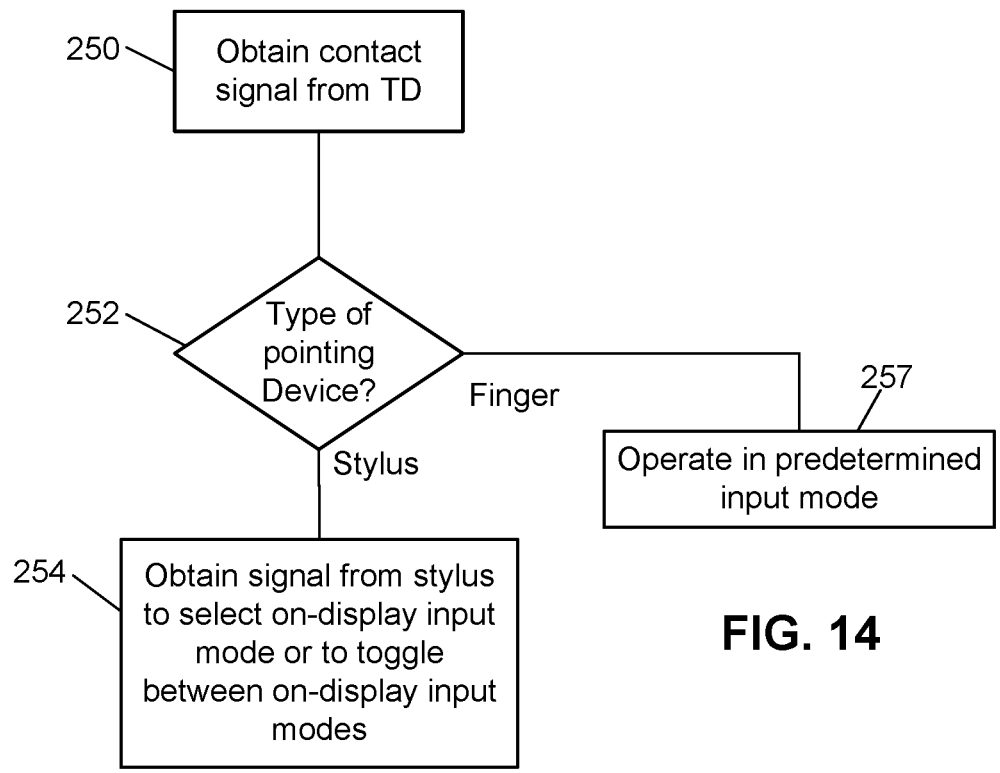
FIG. 14 shows a flowchart of another embodiment of a method in accordance with the present disclosure.

FIG. 14 shows a flowchart of another embodiment of a method according to the present disclosure. Actions 250, 252 and 254 shown in FIG. 14 are the same as action 250, 252 and 254 shown in FIG. 13. However, in the flowchart of FIG. 14, if, at action 252, the processing unit coupled to the TDU determines the pointing device is a finger, then the method may proceed to action 257 where the TD with which the finger is interacting is set to operate in a pre-determined on-display input mode such as, for example, the on-display overlap mode.

Figure 15:
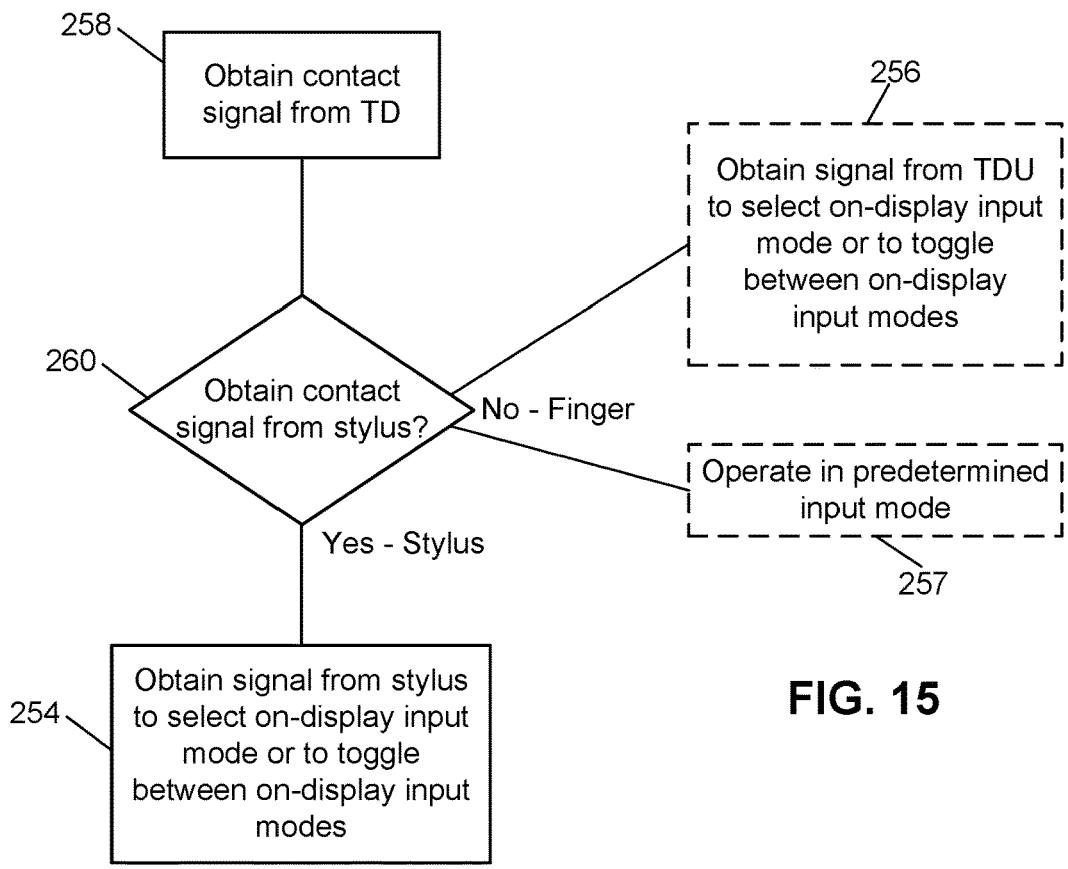
FIG. 15 shows a flowchart of a further embodiment of a method in accordance with the present disclosure.

FIG. 15 shows a flowchart of an embodiment of another method according to the present disclosure. At action 258, a processing unit coupled to a TD obtains a contact signal from the TD indicating that a pointing device (e.g., a stylus) has made physical contact with the TD and, at action 260, verifies if a corresponding contact signal has been obtained from the stylus. That is, the processing unit verifies if there is a corresponding contact signal obtained from the stylus at substantially the same time as the contact signal obtained from the TD. If the corresponding contact signal has been obtained from the stylus, then the method proceeds to action 254, which corresponds to action 254 of FIGS. 13 and 14. In some embodiments, the corresponding contact signal obtained from the stylus may be generated by the stylus when a predetermined interaction between the TD and the stylus. As an example, the predetermined interaction may be the tip of stylus exerting a force against the TD and simultaneously activating a force sensor configured to sense a force being applied along an axis of the stylus. The activation of the force sensor may cause the stylus to generate the stylus contact signal.

In some embodiments, when, at action 260, the processing unit determines that no contact signal from the stylus has been obtained, which may be indicative that a finger is being used as a pointing device, then the processing unit may be configured to proceed to action 256 or to action 257. Action 256 of FIG. 1 is the same as action 256 of FIG. 13. Action 257 of FIG. 15 is the same as action 257 of FIG. 14.

Figure 16:
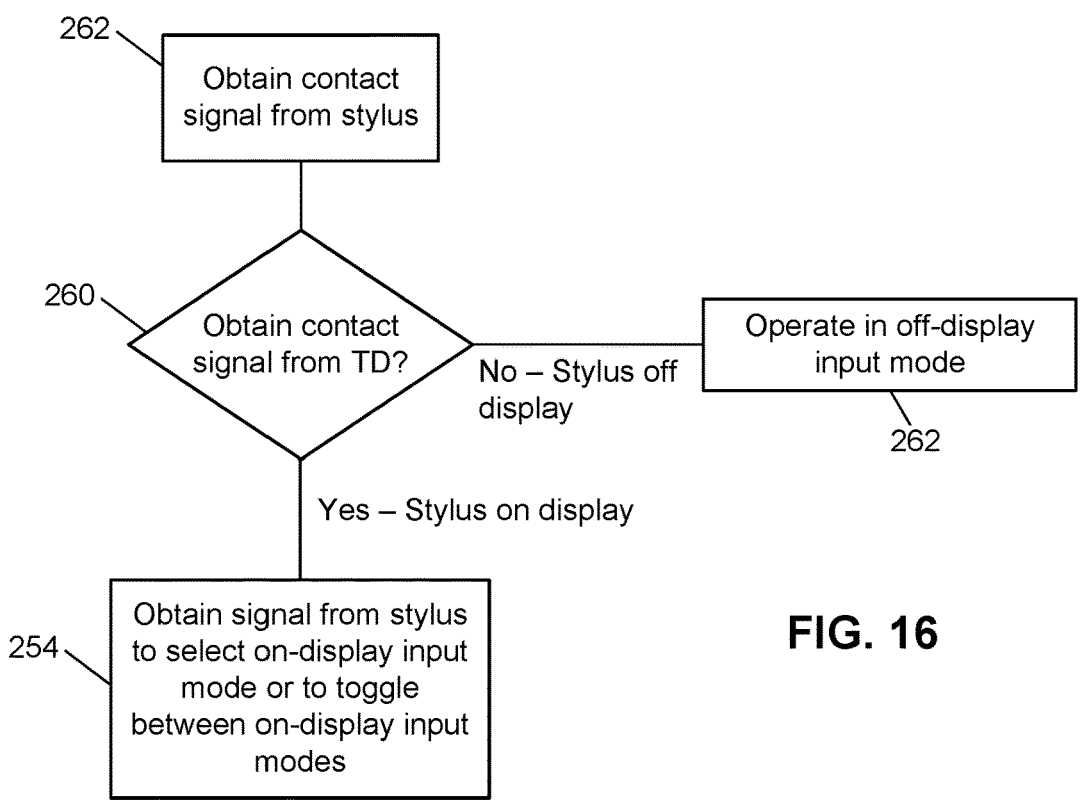
FIG. 16 shows a flowchart of yet another embodiment of a method in accordance with the present disclosure.

FIG. 16 shows a flowchart of an embodiment of a method in accordance with the present disclosure. At action 262, the processing unit a processing unit coupled to a stylus and to a TD obtains a contact signal from the stylus indicating that the stylus device has made physical contact with a surface. At action 264, the processing unit verifies if a corresponding contact signal has been obtained from the TD. That is, the processing unit verifies if there is a corresponding contact signal obtained from the TD at substantially the same time as the contact signal obtained from the stylus. If the corresponding contact signal has been obtained from the stylus, then the method proceeds to action 254, which corresponds to action 254 of FIGS. 13, 14 and 15. In some embodiments, the corresponding contact signal obtained from the stylus may be generated by the stylus when a predetermined interaction between a surface and the stylus. As an example, the predetermined interaction may be the tip of stylus exerting a force against a surface and simultaneously activating a force sensor configured to sense a force being applied along an axis of the stylus. The activation of the force sensor causes the stylus to generate the stylus contact signal.

If, at action 262, the processing unit determines that no contact signal has been obtained from the TD, then the method proceeds to action 264 where the TDU is set to operate in an off-display input mode such as shown in the examples of FIG. 6.

Figure 17:
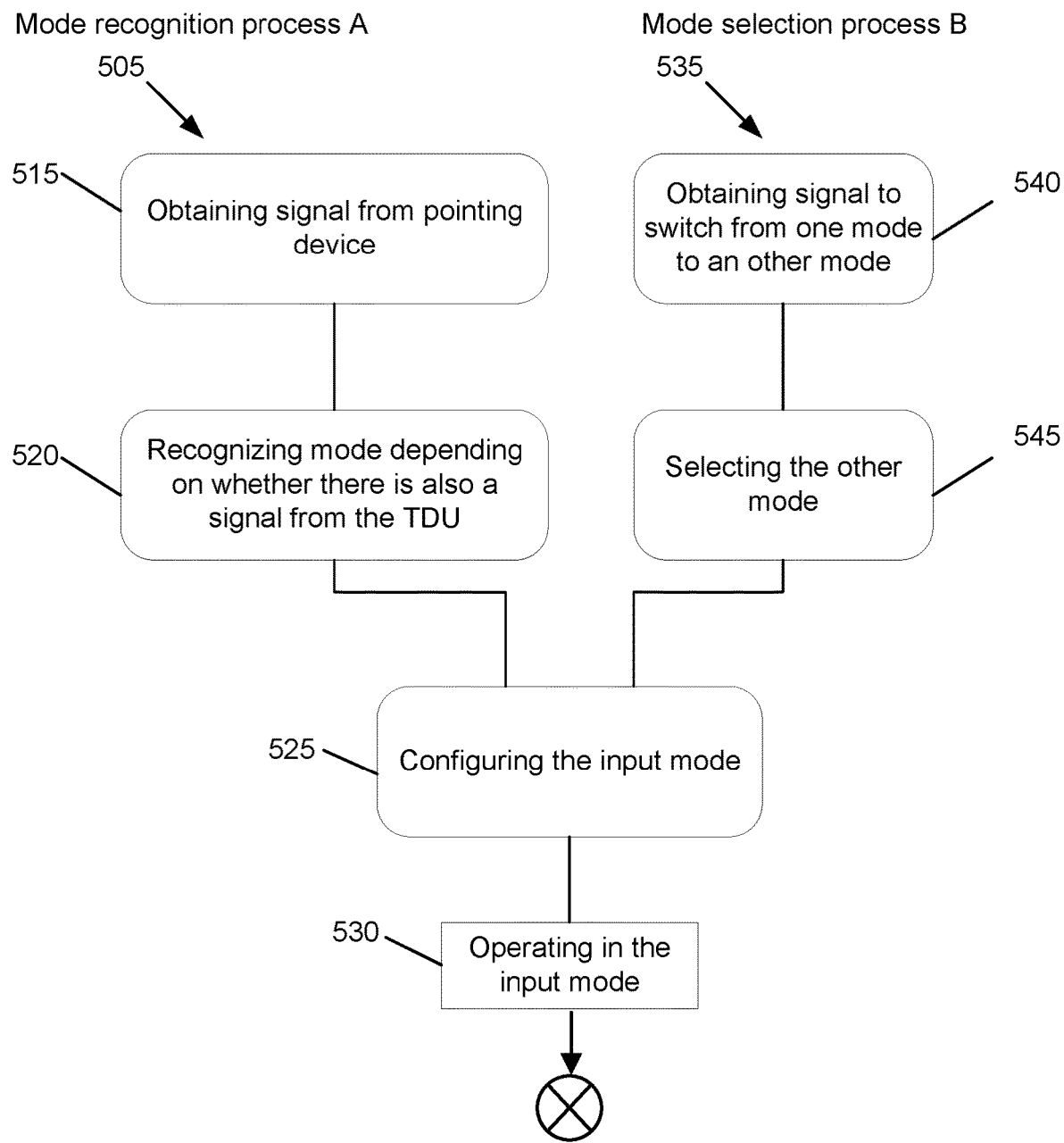
FIG. 17 shows a flowchart of an additional embodiment of a method in accordance with the present disclosure.

FIG. 17 shows a flowchart of an embodiment of a method to configure input modes of a TDU, according to the present disclosure. Initially, a mode recognition process A 505 may be used, which involves a processing unit obtaining, at action 515, a signal from a pointing device. At action 520 an input mode may be recognized depending on whether the processing unit also obtains a signal from a TD of the TDU. At action 525, the input mode may be configured and the TDU may be set, at action 530, to operate in the configured input mode. Alternatively, a mode-switching signal process B 535 may be used, which involves obtaining, at action 540 a signal to switch from one input mode to another input mode. At action 545 the other input mode may be selected. Subsequently, as in process A 505, at action 525, the input mode may be configured and the TDU may be set, at action 530, to operate in the configured input mode. In other words, a mode recognition process A 505 can determine if the pointing device is in physical contact with a TD of the TDU by obtaining a signal from the pointing device and obtaining or not a signal from the TD.

After the input mode of a system has been configured at action 525 according to process A 505 or process B 535, there can be a process to generate an input signal (for writing, moving a cursor or performing other typical user interactions), based on the configured input mode configured. The mode recognition process A 505 may be triggered when the pointing device recognizes has made contact with a TD of the TDU. Process A 505 may require distinguishing between a contact between a pen tip and the TD, and a contact between one or more fingers and the TD. If there is no contact between the pen and the TDU, then the input mode can be set to an off-display input mode. If there is contact between the pen and the TD, in an embodiment, the input mode can be set to the input mode prior to the latest input mode. In other words, the mode can be selected based on both the latest input mode, and the mode prior to the latest input mode.

Figure 18:
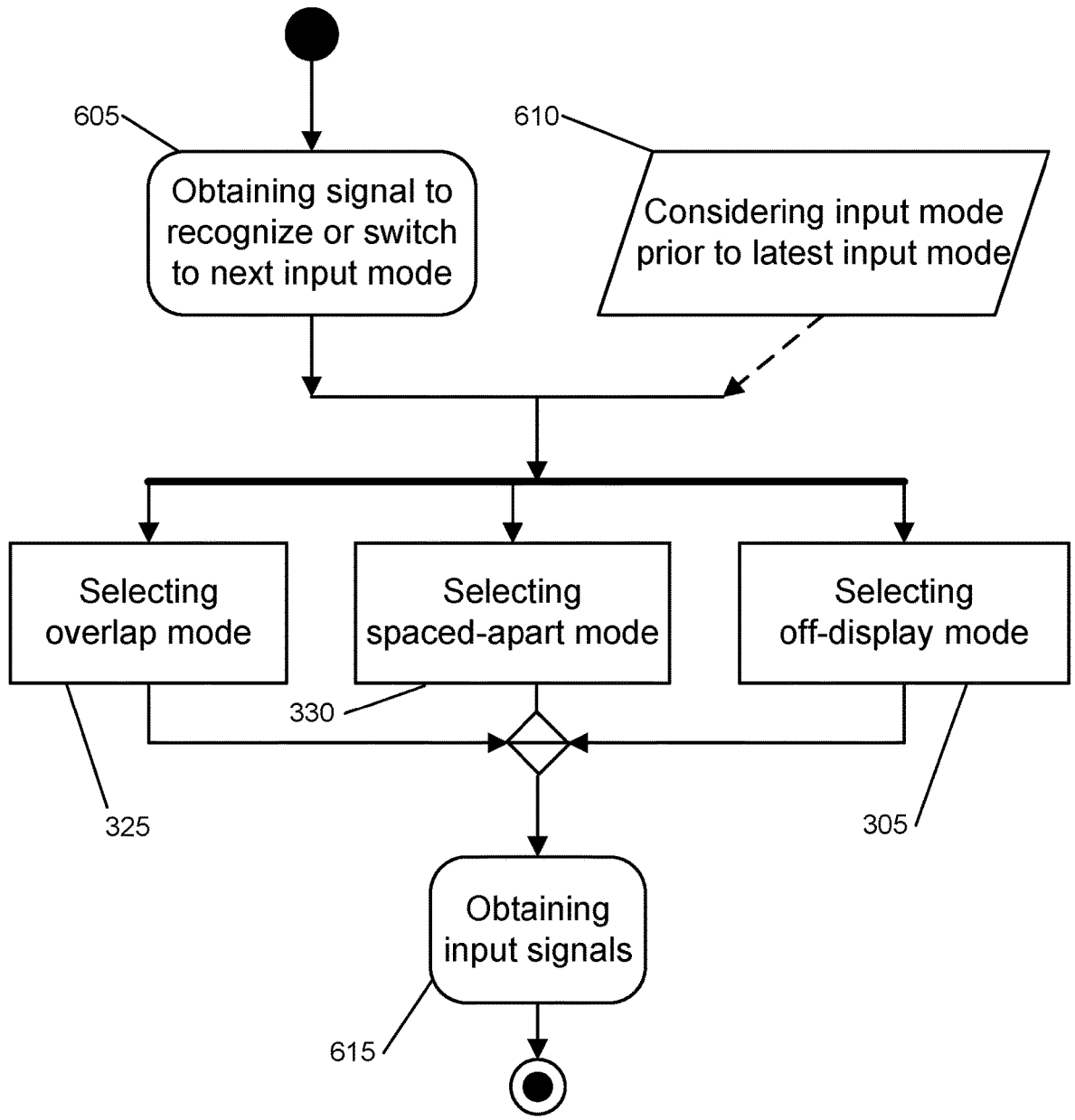
FIG. 18 shows a flowchart of another embodiment of a method in accordance with the present disclosure.

FIG. 18 shows a flowchart of an embodiment of a method for generating an input signal based on an input mode, in accordance with the present disclosure. Initially, at a processing unit of a TDU, a signal is obtained at action 605 for a next input mode to be selected. The input mode prior to the latest input mode may also be considered at action 610. The next input mode may be one of the on-display direct input mode, or "overlap mode" 325; mode 2, the on-display indirect input mode, or "spaced-apart mode" 330, and mode 3, the off-display input mode 305. Input signals may be obtained at action 615 to perform user actions such as writing on a TD of the TDU, moving a cursor on the TD, etc.

Figure 19:
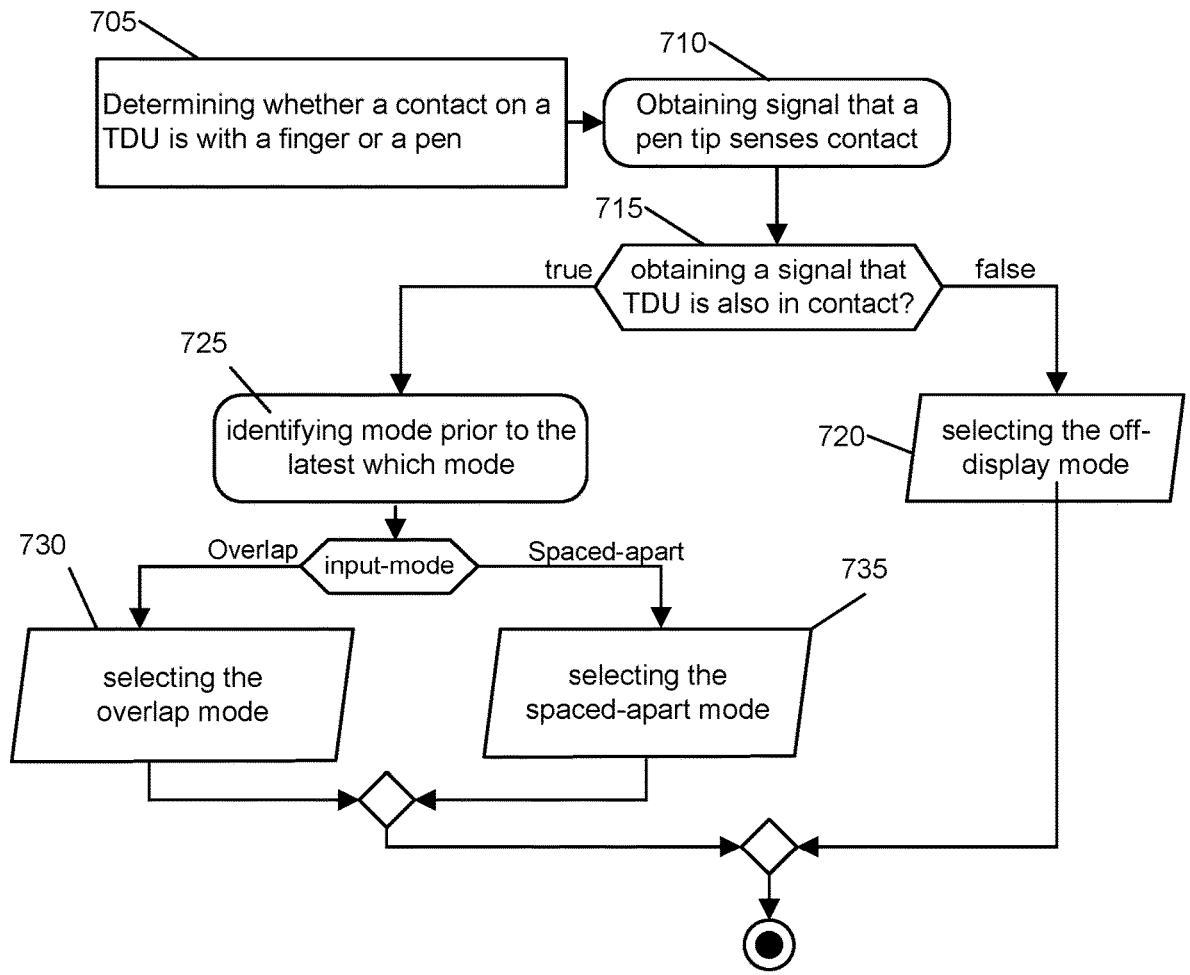
FIG. 19 shows a flowchart of yet another embodiment of a method in accordance with the present disclosure.

FIG. 19 shows a flowchart of an embodiment of a method for recognizing an input mode, according to the present disclosure (e.g., a mode recognition process similar to the mode recognition process A 505). Initially, a processing unit of TDU system or of a TD can determine, at action 705, whether a contact on a TD of the TDU is with a finger or with a stylus (pen). Then, at action 710, a signal may be obtained from the stylus to indicate the stylus has made contact with a surface. If there is no signal from the TD, then the system can select, at action 720, the off-display mode. If the processing unit also obtains a contact signal from the TD, then the pointing device is in contact with the TDU, and the system can identify, at action 725, the on-display mode prior to the latest mode. If the mode prior to the latest mode was the on-display direct input mode, then the processing unit can select, at action 730, the overlap mode (on-display direct input mode). If the mode prior to the latest mode was the spaced-apart mode (on-display indirect input mode), then the processing unit can select, at action 735, the spaced-apart mode.

Referring again to FIG. 17, the mode selection process B 535 may occur when a user interacts with the TDU with the pointing device to generate a mode switching signal to switch between the overlap mode the spaced-apart mode. The mode switching signal may be generated by the pointing device (stylus) as a result of an interaction with the user. The TDU or a processing unit of the TDU may obtain the mode switching signal, where obtaining the mode switching signal comprises obtaining the mode switching signal from the pointing device.

In an embodiment, when the TDU operates in the spaced-apart mode, the TDU may be configured to display a trackpad on at TD of the TDU, and the position and the movement of the pointing device on the track pad may be reproduced in the position and the movement of the cursor or sign on the TD.

Figure 20:
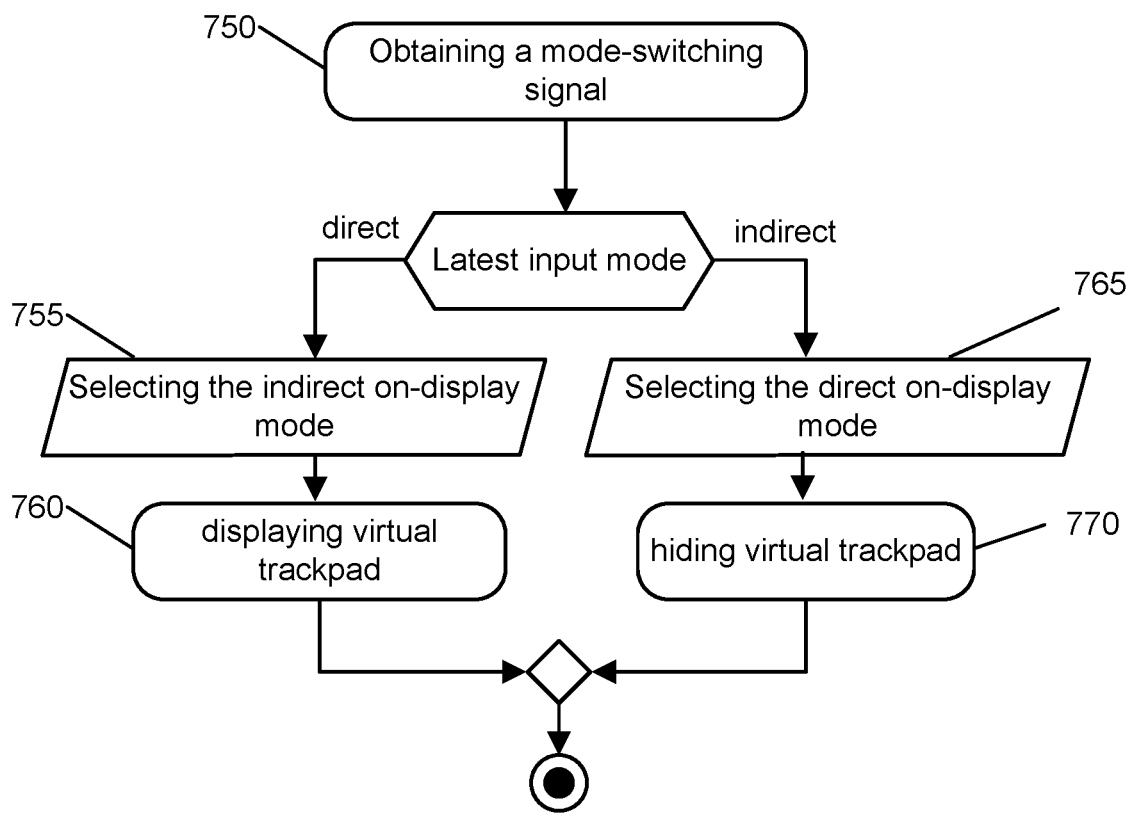
FIG. 20 shows a flowchart of yet another embodiment of a method in accordance with the present disclosure.

FIG. 20 shows a flowchart of an embodiment of a method to switch the input mode between the overlap mode and the spaced-apart mode, in accordance with the present disclosure. A processing unit of a TDU can obtain, at action 750, a mode-switching signal. If the latest input mode used by the TDU was the overlap mode, the processing unit can select, at action 755, the spaced-apart mode, and display, at action 760, a virtual track pad on a TD of the TDU. If the latest input mode of the TDU was the spaced-apart mode, the processing unit can select, at action 765, the overlap mode, and hide, at action 770, the virtual track pad.

Figure 21:
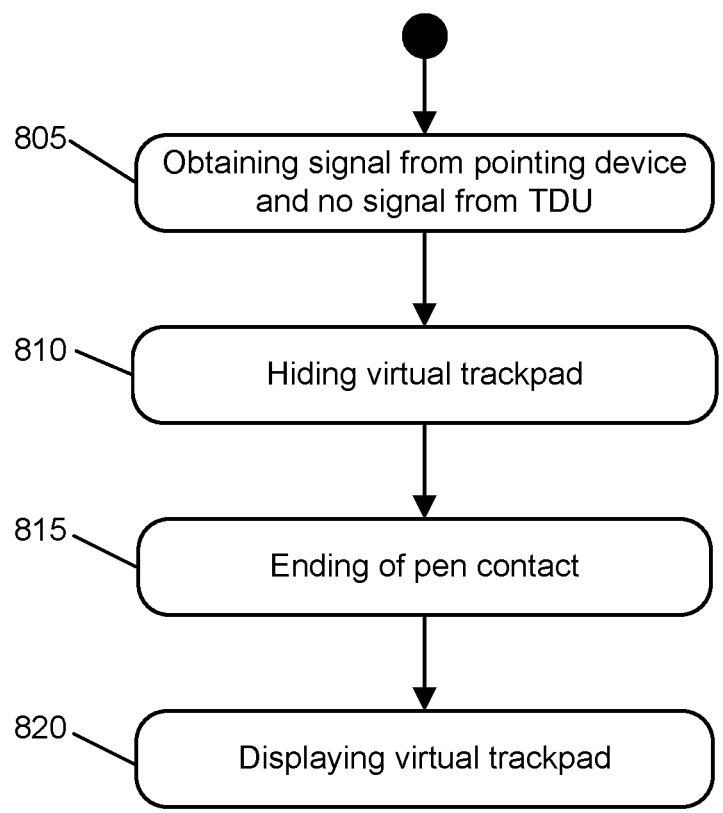
FIG. 21 shows a flowchart of yet another embodiment of a method in accordance with the present disclosure.

FIG. 21 shows a flowchart of an embodiment of a method for handling a virtual trackpad when switching between the overlap mode and the off-display mode, in accordance with the present disclosure. If a processing unit of a TDU obtains, at action 805, a signal, from a pointing device but none from any TD of the TDU, then the processing unit may hide, at action 810, a virtual trackpad of a TD of the TDU. If the processing unit does not obtain, at action 815, a signal from a pointing device, then it can display, at action 820, a virtual trackpad on the TD again.

Once an input mode has been selected, an input signal (for writing, moving a cursor, etc.) can be obtained. Differentiation between an input signal of in the overlap input mode and an input signal in the off-display mode 305 may be based on whether a contact signal from the TD is obtained.

When the input mode is the spaced-apart mode, a pointing device can be in contact with a TD of a TDU, but not within the bounds of a displayed virtual trackpad. Also, when using a DDL with two TDs, the pointing device can interact alternatively with both TDs. For the spaced-apart mode 330, the movement of a cursor on one of the TDs may be scaled from the size of a virtual trackpad on the other TD. For the off-display mode, the control display gain of the pen tip movement to the cursor movement may be allowed to be dynamically adjusted.

Figure 22:
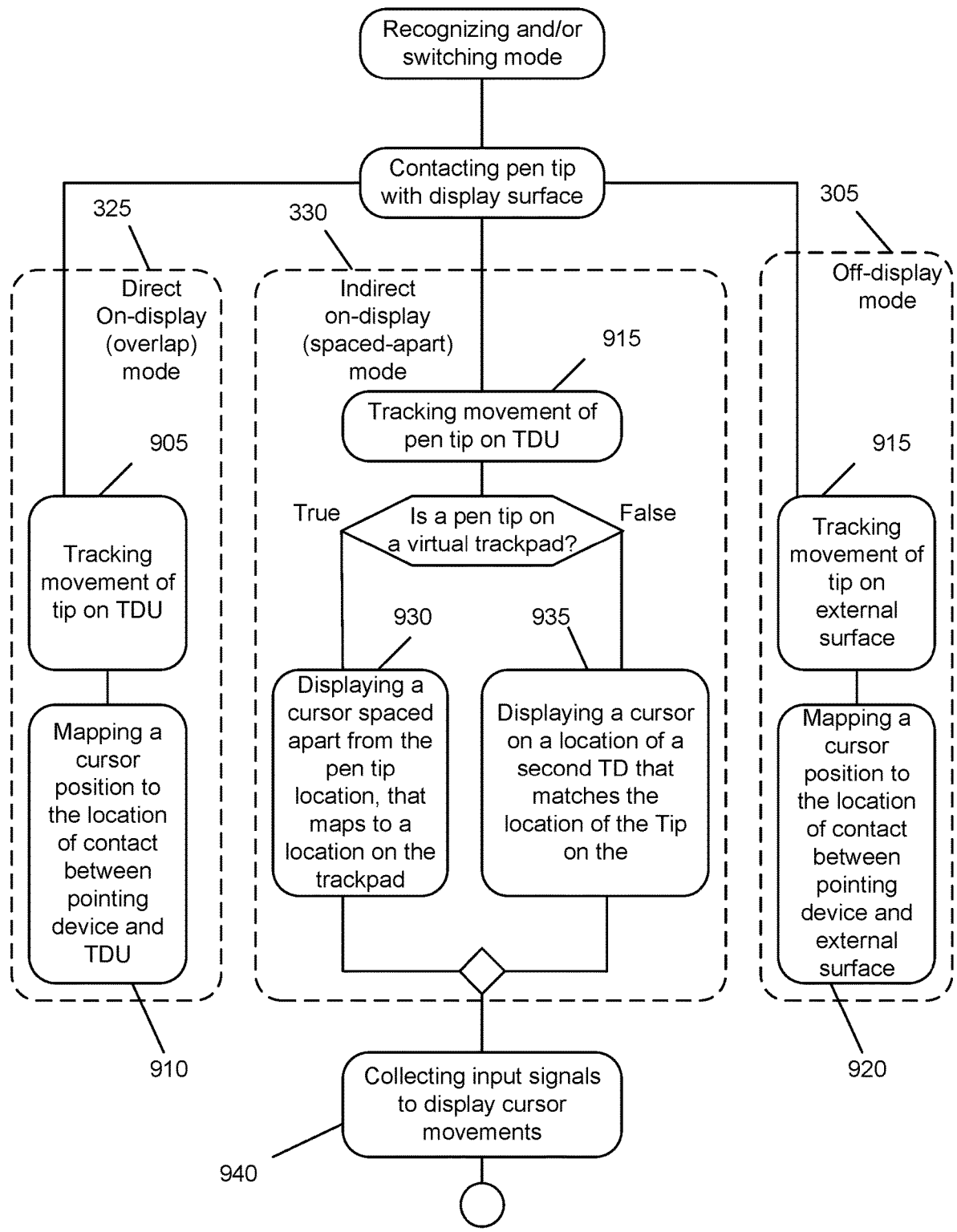
FIG. 22 shows a flowchart of yet another embodiment of a method in accordance with the present disclosure.

FIG. 22 shows a flowchart of an embodiment of a method for determining the location of a cursor on a screen, in accordance with the present disclosure. In an embodiment, there may be three modes of interaction between a pointing device and a cursor or an item on a TD or on a display without touch detection.

For an overlap mode, where strokes of a pointing device on a TD of a TDU are represented on the TD overlapping the contact point of the pointing device on the TD, the TDU (processing unit of the TDU) can track at action 905, the movement of the pointing device's tip on the TD, and map, at action 910, a cursor position to the location of contact between the pointing device's tip and the TD.

For an off-display mode, where strokes of a pointing device on an arbitrary surface (on a surface other than a touch surface of a TD of the TDU) are represented on one or more TD of the TDU, the TDU can track, at action 915, the movement of the pointing device's tip on the arbitrary surface, and map, at action 920, a cursor position on a TD or more than one TD of TDU to the location of contact between the pointing device's tip and the arbitrary surface.

For a spaced-apart mode, where strokes of a pointing device on a TD of a TDU are shown, on the same TD or on another TD of the TDU, spaced-apart from the tip of the pointing device, the TDU can track at action 925, the movement of the pointing device's tip on a TD of the TDU. If the tip of the pointing device is on a virtual trackpad, the TDU can display, at action 930, a cursor spaced apart from the pen tip location, that maps to a location on the trackpad. If the tip is on a first TD but not on a virtual trackpad of the first TD, the TDU can display, at action 935, a cursor on a second TD of the TDU, at a position equivalent to that of the pointing device tip on the first TD.

Once an input mode is selected, the TDU can collect, at action 940, input signals to display cursor positions and movements.

Once the surface on which a pointing device is interacting with has been determined, other input signals collected from the pen can be the same regardless of the surface or the input mode. These other input signals can include mouse functions like clicking and scrolling, as well as pen gestures. If the cursor position is used with an application that supports pressure and tilt inputs, equivalent input signals can also be generated.

Figure 23:
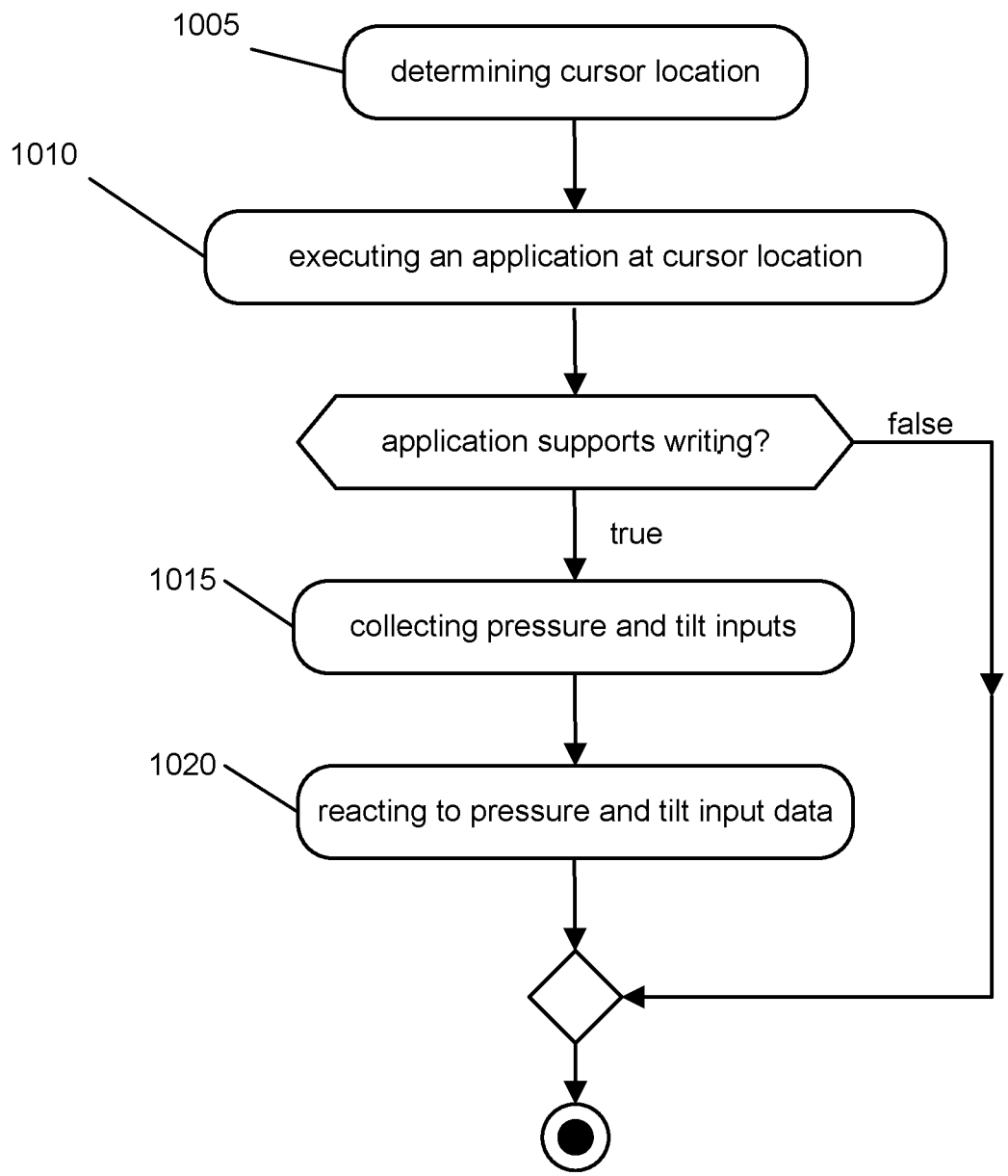
FIG. 23 shows a flowchart of yet another embodiment of a method in accordance with the present disclosure.

FIG. 23 shows a flowchart of an embodiment of a method for handling functions of a pointing device other than strokes, for an application supporting such other pen functions, in accordance with the present disclosure. Initially, a TDU can determine, at action 1005, a cursor location based on input signals obtained from a pointing device. The TDU may then execute, at 1010, an application represented by, e.g., an icon at the cursor location. If the application supports writing from a pointing device, the system can collect, at action 1015, input signals from pressure and tilt sensors comprised in the pointing device, and react, at action 1020, to the input data. If the application does not support writing from a pointing device, there can be no collection or reaction to pressure and tilt input signal.

TDU and methods according to embodiments of the present disclosure may enable the detection of a tip of a pointing device with any surface, distinguish between a stylus coming in contact with a TD of a TDU and the stylus coming in contact with a surface other than any surface of the TDU, differentiate between a stylus coming in contact with a TD of the TDU and a fingertip coming in contact with the TD, track a movement of a stylus on a TD of a TDU, track a movement of a stylus on a surface other than any surface of a TDU, generate input signals from a mouse input (e.g., clicking or scrolling), a stylus (pressure sensing, tilt sensing, acceleration sensing), a gesture of a hand of a user made when holding the stylus, obtain a switching signal to switch between input modes, adjust a control display gain in relation to a movement of a pointing device on a surface other than any surface of a TDU.

Figure 24:
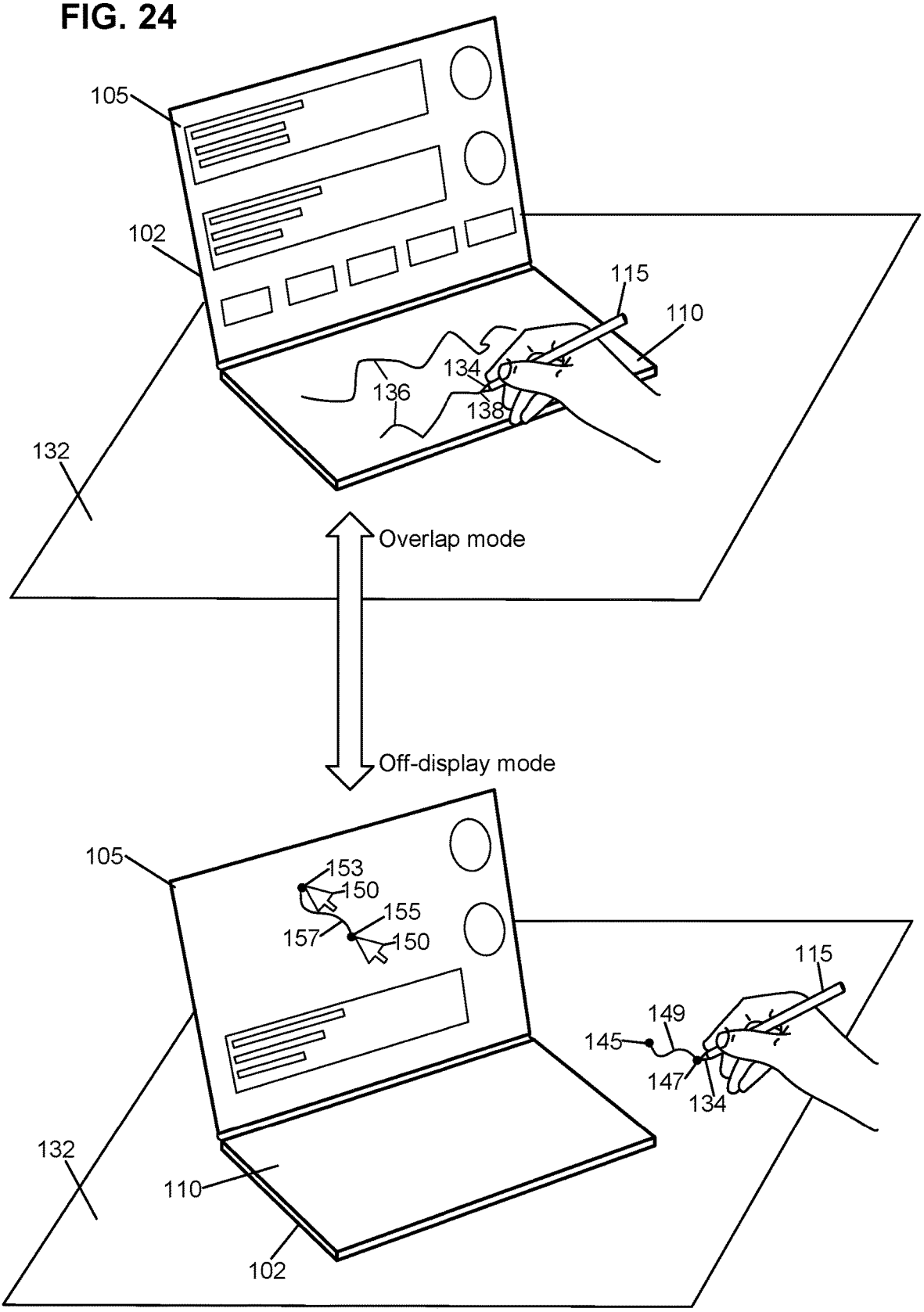
FIG. 24 shows an example of a user can smoothly switch between an overlap mode and an off-display mode, in accordance with the present disclosure.

FIG. 24 shows how, according to the present disclosure, a user can smoothly switch between an overlap mode and an off-display mode, by moving the pointing device from a TD 110 operating in the overlap mode to a surface 132 other than a TD surface. This technique can be applied to different TDUs such as convertible laptops, tablets, and dual screen laptops.

On a DDL, moving a cursor from one TD to the other TD may be hindered by a physical hinge between the DDL's two TDs. Hence, when using a pen or finger in an overlap mode, the task of dragging an object (e.g., an icon) between the first TD and the second TD, and vice-versa may be difficult to accomplish. In an embodiment according to the present disclosure, a user can change from a direct cursor control of an overlap mode to an indirect cursor control of a spaced-apart mode, and vice versa, because with pointing device according to embodiments, a user can switch from one mode to the other, as the pointing device approaches or reaches the physical hinge. When, for example, a user is using a dual screen laptop to make an electronic presentation, the presentation software can be running on a first TD, and a drawing application can be running on a second TD.

Figure 25A:
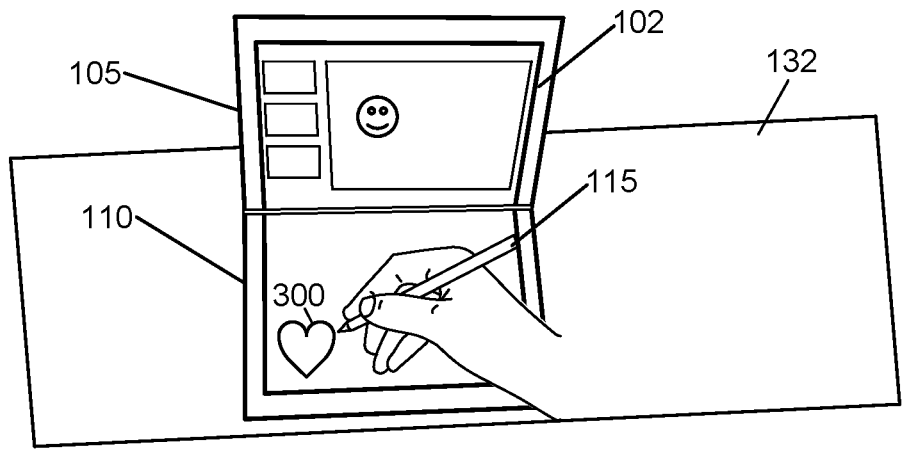
FIGS. 25A, 25B and 25C show an example of using a single pointing device for different pointing techniques, according to an embodiment of the present disclosure.
Figure 25B:
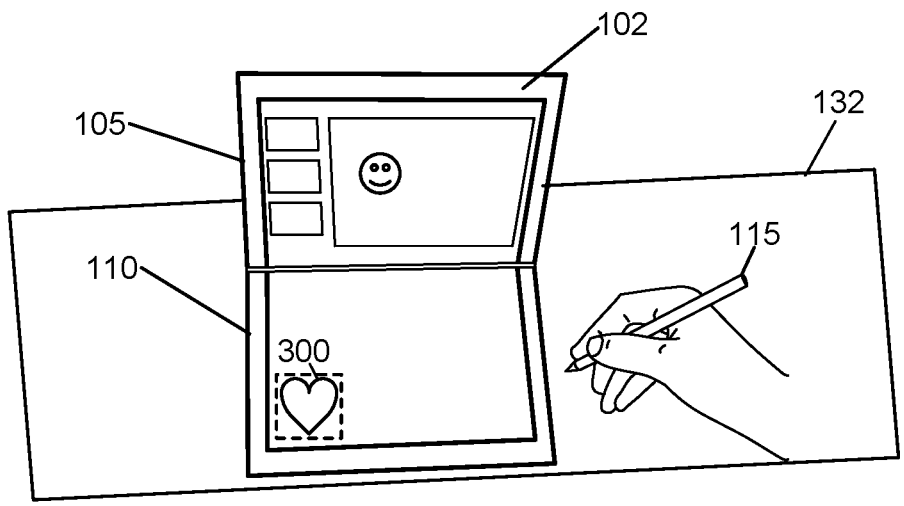
Figure 25C:
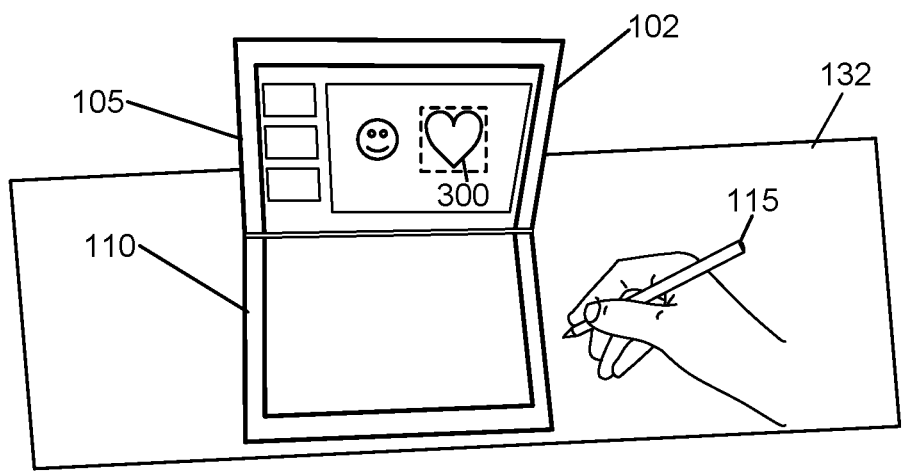

FIGS. 25A, 25B and 25C show an example of using a single pointing device for different pointing techniques, according to an embodiment of the present disclosure. In this embodiment, a stylus 115 (pointing device) is used with a DDL 102 to prepare an electronic presentation. The DDL 102 is supported by a surface 132. The presentation application runs on the DDL 102 and displays a presentation slice on the TD 105. A drawing application also runs on the DDL 102 and displays a drawing 300 on the TD 110. FIG. 25A shows the DDL 102 operating in an overlap mode where the TD 110 shows the drawing 300 in response to input from the stylus 115. After completing the drawing 300, the user may move the stylus 115 from the TD 110 and bring the stylus 115 into contact with the surface 132, which may trigger a mode switch from the overlap mode to an off-display mode. In this example, the DDL 102 is configured such that a tap of the stylus 115 on the surface 132 selects the drawing 300, as shown in FIG. 25B. Subsequently, a upward stroke of the stylus 115 moves the drawing 300 to presentation application and shows the drawing 300 on the TD 105, as shown in FIG. 25C.

Figure 26A:
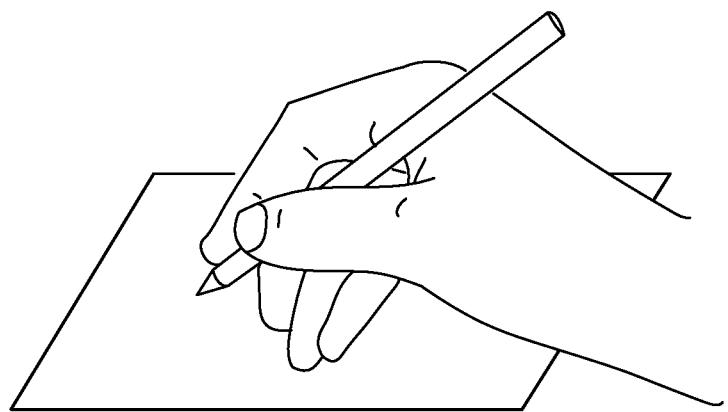
FIGS. 26A and 26B shows an example of how to switch from one input mode to another by changing a tilt angle of a stylus, in accordance with the present disclosure.
Figure 26B:
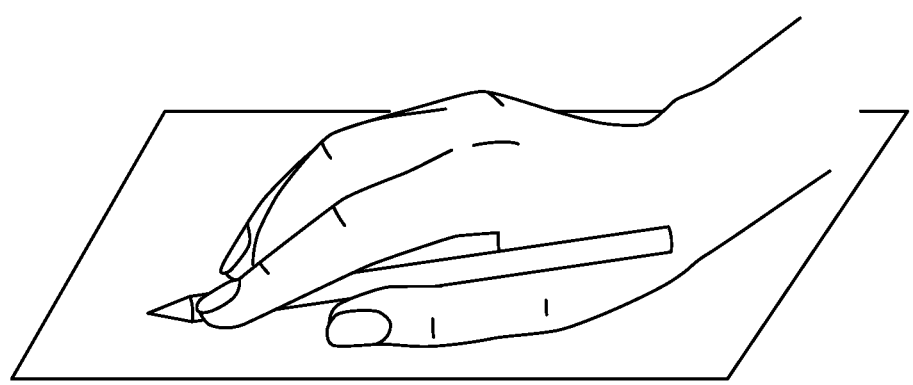

In another embodiment according to the present invention, switching from an overlap mode to a spaced-apart mode (or vice-versa) may be effected by tilting the stylus from a first orientation such as shown in FIG. 26A, to a second orientation such as shown in the example of FIG. 26B.

In another embodiment, the input mode may remain the same as long as an orientation of the pointing device satisfies a predetermined orientation criteria but may change to another input mode when the orientation of the pointing device no longer satisfies the pre-determined orientation criteria or, when the orientation of the pointing device satisfies another predetermined orientation criteria. As an example, the input mode may be the overlap mode when the pointing device (e.g., a stylus) is at an angle of 45° or more from the horizontal but, the input mode may be the spaced-apart mode when the pointing device is at an angle less than 45°.

In a further embodiment, switching from an overlap mode to a spaced-apart mode may be effected by the user of a pointing device changing the manner of gripping the pointing device, or by changing the position of the fingers (finger chord) on the TD.

Figure 27A:
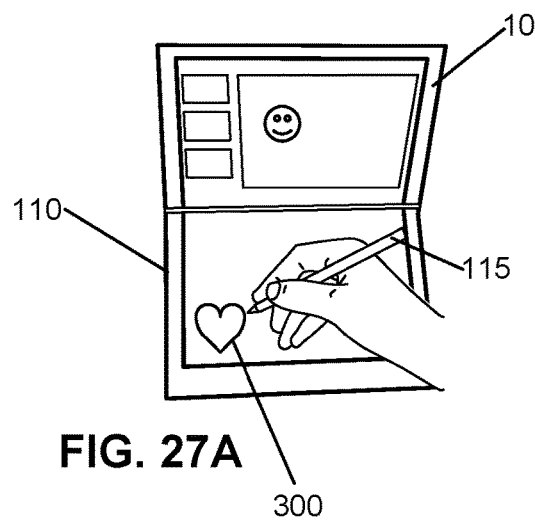
FIGS. 27A, 27B, 27C and 27D show another example of how to switch from one input mode to another by changing a tilt angle of a stylus, in accordance with the present disclosure.
Figure 27B:
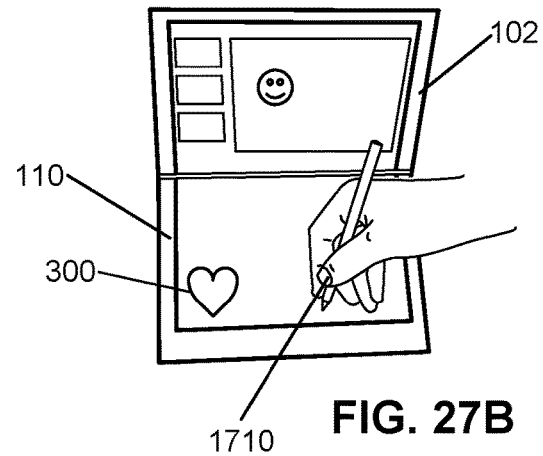
Figure 27C:
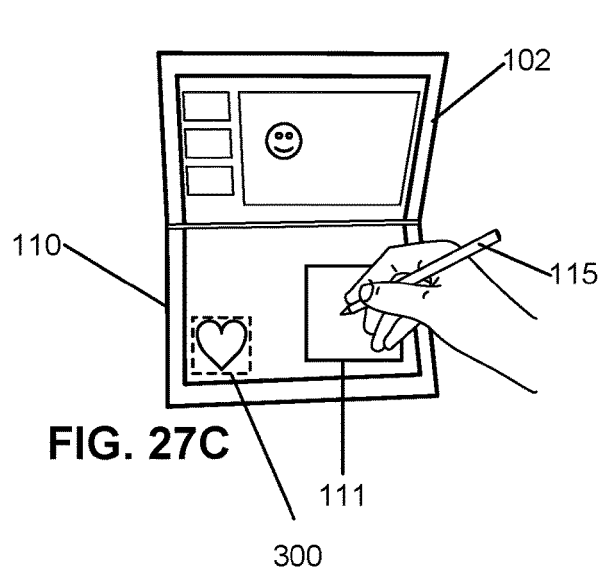
Figure 27D:
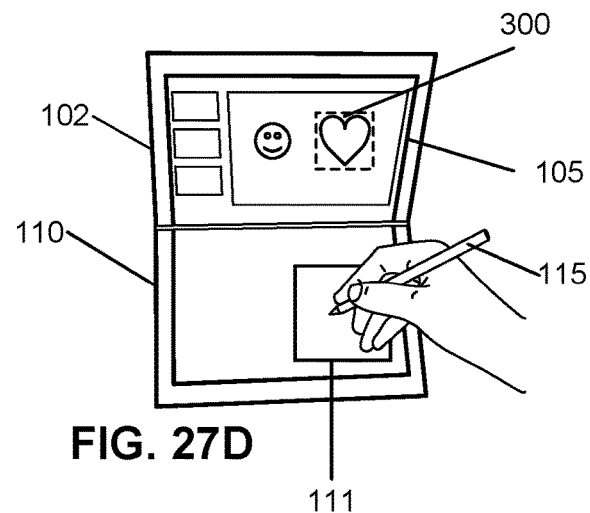

FIGS. 27A-27D shows an embodiment where a DDL 102 is configured to switch from an overlap mode to a spaced-apart mode by changing the angle of the stylus 115. FIG. 27A shows a DDL 102 operating in an overlap mode where a TD 110 shows a drawing 300 drawn in response to input from the stylus 115. FIG. 27B shows the stylus 115 oriented at a greater angle from the horizontal than it was when drawing. In the present embodiment, increasing the angle from the horizontal to a value greater than any preset angle value (e.g., 60°) changes the input mode to a spaced-apart mode and causes the TD 110 to display a trackpad 111, as shown in FIG. 27C. The user may then select the drawing 300 and move it to the TD 105, as shown in FIG. 27D. To change back to the overlap input mode, the user may again orient the stylus 115 to an angle greater than the preset angle value, as shown in FIG. 27B.

On a TDU 110, a user can be using an overlap mode 325 to draw with a pen. Once the drawing is completed, the user can move the completed drawing to PPT® on the upright screen 105. To move the drawing, a virtual trackpad can be called out with a finger chord or by tilting the pen, thereby allowing the user to quickly switch to a space-apart mode 330 covering both screens, by interacting with the virtual trackpad. The user is then able to select the item and drag it to the upright screen 105 by using the trackpad with the pen. This can be a quick method for changing the pointing technique on the same working surface.

When operating a system having different interface modes, a pointing device and methods according to embodiments can be sufficient, making the ability to transition quickly economical and portable. This can result in the total number of devices being reduced.

A pointing device according to embodiments can be used as a medium for cross-device communication, i.e. as a relay point for input signals from one or more further devices.

A pointing device according to embodiments can be used in cooperation with a plurality of other pointing devices according to embodiments, any of which can be used to interact with the same computer.

A pointing device according to embodiments includes one or more of a pen, and one or more finger, any of which can be fitted with sensors including an IMU and a capacitive wrapping, thereby allowing for hand posture recognition mechanisms and gesture recognition mechanisms, to assist in drawing 3D objects.

A pointing device according to embodiments can be used in an existing or future system requiring switching among different pointing techniques.

A system according to embodiments can reduce the time spent switching from one pointing technique to another pointing technique, and obviate the need for switching from one pointing device to another pointing device.

A system according to embodiments can facilitate and encourage the use of a pointing techniques that is more appropriate for a given mode of operation, and in some situations, this can help improve productivity of the user.

With a pointing device according to an embodiment, a user can switch from a TDU interface or a virtual trackpad interface, to a mouse-like interface when the user places the pointing device the pen on an everyday surface. A user can also return to a TDU interface or a virtual trackpad interface.

In an embodiment, a virtual trackpad can be made to appear on a TDU 110 by performing one of various gestures. When placing a pointing device on a virtual trackpad, input signals caused by contact with the pointing device can be from the TDU at the virtual trackpad and used for performing cursor movements space apart from the point of contact.

In an embodiment, a non-display indirect input mode, or "stylus mode" can include features supported by some applications, such as tilting of the pointing device and pressure of a pointing device's tip against a surface. Such features can modify how strokes are implemented in an application. Embodiments can also include features such as left-clicking, right-clicking, scrolling, using components of a pointing device. To implements these features, a pointing device according to embodiments can include one or more of a button, a capacitive sensing surface, a pressure sensor, an IMU, and other sensors.

Figure 28:
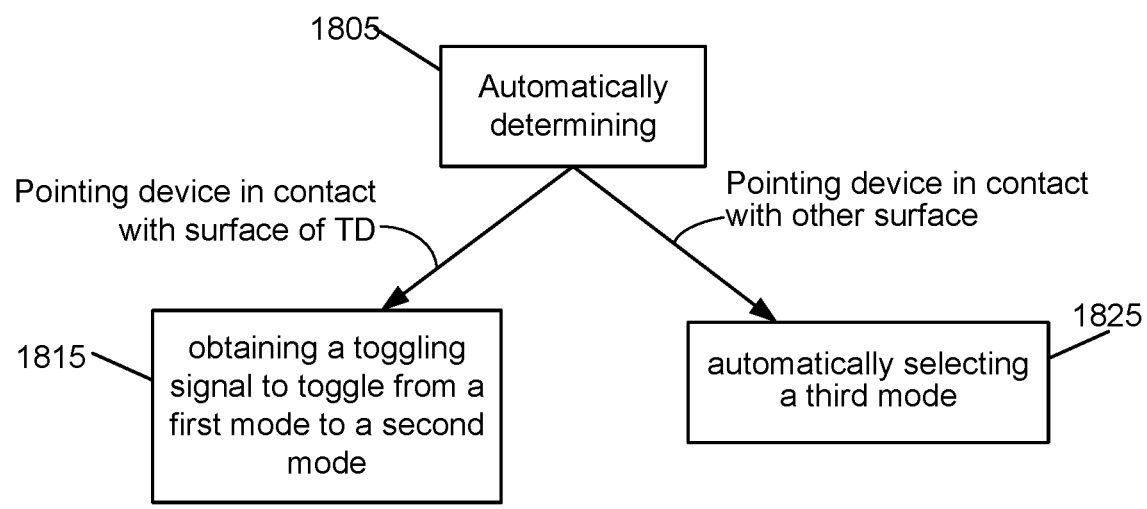
FIG. 28 shows a flowchart of yet another embodiment of a method in accordance with the present disclosure.

FIG. 28 shows a flowchart of an embodiment of a method according to an embodiment of the present disclosure, the method being for selecting one of a plurality of input modes. Each of the plurality of input modes defines a distinct spatial relationship between a pointing device and an image displayed on a TD of TDU. In the context of the present disclosure, the image may have a size of one or more pixels and correspond to dot displayed on the TD in response to an action performed at, or with, the pointing device. As non-limiting examples, the image may be a portion of a trace being drawn by the pointing device, or an icon displayed on the TD. The TD is coupled to a processor (processor unit) and has an input surface. The method comprises, at the processor: determining, at action 1805, if the pointing device is in physical contact with the input surface of the TD or with a surface distinct from the input surface of the TD.

When the processor determines the pointing device is in contact with the input surface of the TD, the method proceeds to action 1815, where the processor obtains a toggling signal to toggle from a first input mode to a second input mode. The first mode is one of: an overlap mode where a contact region between the pointing device and the input surface of the TD overlaps the image; and a spaced-apart mode where the image is spaced apart from the contact region and where the contact region and the sign are non-overlapping. The second mode is the other of the overlap mode and the spaced-apart mode.

When the processor determines the pointing device is in physical contact with a surface distinct from the input surface of the TD, the method proceeds to action 1825 where a third mode is selects. The third mode is where a position and a movement of the pointing device on the surface distinct from the input surface of the TDU is reproduced as a position and a movement of the image on the TD.

Figure 29:
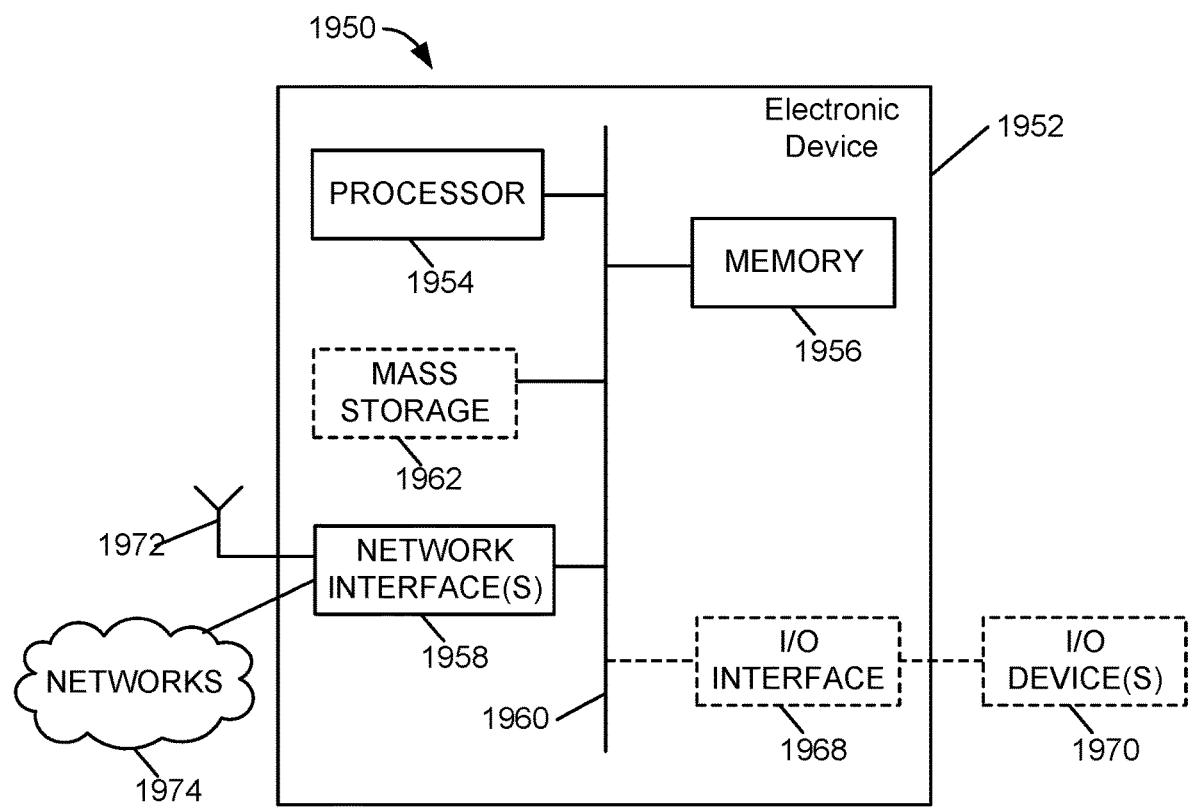
FIG. 29 shows a block diagram of an embodiment of an electronic device in accordance with the present disclosure.

FIG. 29 shows a block diagram of an embodiment of an electronic device (ED) 1952, in accordance with the present disclosure. The ED 1952 is shown within a computing and communications environment 1950 that may be used for implementing the devices and methods disclosed herein, such as TD devices and methods for operating the TD devices in a plurality of different interface modes (input modes) and for switching from one input mode to another. The ED 1952 typically includes a processor 1954, such as a central processing unit (CPU), and may further include specialized processors such as a field programmable gate array (FPGA) or other such processor, a memory 1956, a network interface 1958 and a bus 1960 to connect the components of ED 1952. ED 952 may optionally also include components such as a mass storage device 1962, a video adapter 1964, and an I/O interface 1968 (shown in dashed lines).

The memory 1956 may comprise any type of non-transitory system memory, readable by the processor 1954, such as static random-access memory (SRAM), dynamic random-access memory (DRAM), synchronous DRAM (SDRAM), read-only memory (ROM), or a combination thereof. In an embodiment, the memory 1956 may include more than one type of memory, such as ROM for use at boot-up, and DRAM for program and data storage for use while executing programs. The bus 1960 may be one or more of any type of several bus architectures including a memory bus or memory controller, a peripheral bus, or a video bus.

The ED 1952 may also include one or more network interfaces 1958, which may include at least one of a wired network interface and a wireless network interface. A network interface 1958 may include a wired network interface to connect to a network 1974, and also may include a radio access network interface 1972 for connecting to other devices over a radio link. The network interfaces 1958 allow the ED 1952 to communicate with remote entities such as those connected to network 1974.

The mass storage 1962 may comprise any type of non-transitory storage device configured to store data, programs, and other information and to make the data, programs, and other information accessible via the bus 1960. The mass storage 1962 may comprise, for example, one or more of a solid-state drive, hard disk drive, a magnetic disk drive, or an optical disk drive. In some embodiments, mass storage 1962 may be remote to the ED 1952 and accessible through use of a network interface such as interface 1958. In the illustrated embodiment, mass storage 962 is distinct from memory 1956 where it is included and may generally perform storage tasks compatible with higher latency but may generally provide lesser or no volatility. In some embodiments, mass storage 962 may be integrated with a heterogeneous memory 1956.

In an embodiment, a system for operating in an interface mode and for switching from one interface mode to an another can comprise at least one processor 1954; a touchscreen display unit (TDU) having an input surface; a pointing device; the at least one processor being in communication with the TDU and the pointing device; and machine readable memory storing machine readable instructions which when executed by the at least one processor, configures the at least one processor to automatically determine if the pointing device is in physical contact with the input surface of the TDU or with a surface distinct from the input surface of the TDU; when the pointing device is in contact with the input surface of the TDU: obtain a toggling signal to toggle from a first mode to a second mode, the first mode being one of: an overlap mode where a contact region between the pointing device and the input surface of the TDU overlaps the sign; and a spaced-apart mode where the sign is spaced apart from the contact region and where the contact region and the sign are non-overlapping, the second mode being the other of the overlap mode and the spaced-apart mode; and, when the pointing device is in physical contact with the surface distinct from the input surface of the TDU: automatically select a third mode where a position and a movement of the pointing device on the surface distinct from the input surface of the TDU is reproduced as a position and a movement of the sign on the TDU. The network interface 1974 and I/O interface 1968 can also allow for storage and/or processing to occur externally.

Embodiments include a touchscreen display system, comprising: a processing unit; and a touchscreen display unit (TDU) having an input surface and being coupled to the processing unit, the touchscreen display system having a plurality of input modes each of which defining a distinct spatial relationship between a pointing device (PD) coupled to the touchscreen display system and a sign displayed on the TDU, the processing unit being configured to: obtain a TDU signal from the TDU when the pointing device is in physical contact with the input surface, obtain a PD signal from the pointing device when the PD is in contact with a surface, and determine the PD is in physical contact with the input surface when the TDU signal is obtained, determine the PD is contact with another surface distinct from the input surface of the TDU when the PD signal is obtained in absence of the TDU signal, the processing unit being configured to, when the PD is in physical contact with the input surface of the TDU: obtain a toggling signal from the PD to toggle from a first mode to a second mode, the first mode being one of: an overlap mode where a contact region between the PD and the input surface of the TDU overlaps the sign; and a spaced apart mode where the sign is spaced apart from the contact region and where the contact region and the sign displayed on the TDU are non-overlapping, the second mode being the other of the overlap mode and the spaced apart mode; and, the processing unit being configured to, when the PD is in physical contact with the other surface: automatically select a third mode where a position and a movement of the PD on the other surface is reproduced in a position and a movement of the sign on the TDU.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method of selecting one of a plurality of input modes, each of the plurality of input modes defining a distinct spatial relationship between a pointing device (PD) and a position of a visual element displayed on a touch display (TD) of a touch display unit (TDU), the TD being coupled to a processor, the TD having an input surface, the method comprising, at the processor:
   determining if the PD is in physical contact with the input surface of the TD or with a surface distinct from the input surface of the TD;
   when the PD is in contact with the input surface of the TD:
      obtaining a toggling signal to toggle from a first mode to a second mode, the first mode being one of:
         an overlap mode where a contact region between the PD and the input surface of the TD overlaps the visual element; and
         a spaced-apart mode where the image is spaced apart from the contact region and where the contact region and the visual element are non-overlapping, the second mode being the other of the overlap mode and the spaced-apart mode.

2. The method of claim 1, further comprising:
   when the PD is in physical contact with the surface distinct from the input surface of the TD:
      automatically selecting a third mode where a position and a movement of the PD on the surface distinct from the input surface of the TD is reproduced as a position and a movement of the visual element on the TD.

3. The method of claim 1, wherein automatically determining if the PD is in physical contact with the input surface of the TD or with the surface distinct from the input surface of the TD comprises, at least one of:
obtaining a TD contact signal from the TD;
obtaining the TD contact signal device and obtaining a PD contact signal from the PD; and
obtaining the PD contact signal in absence of the TD contact signal.

4. The method of claim 1, wherein:
the TD is a capacitive TD and is configured to generate a TD contact signal when the PD is in contact with the input surface of the TD, and
automatically determining the PD is in physical contact with the input surface of the TD comprises the processor obtaining the TD contact signal.

5. The method of claim 4, wherein:
the PD has a sensor configured to generate a PD contact signal when the PD is in contact with the input surface of the TD or with the input surface distinct from the input surface of the TD, and
automatically determining the PD is in physical contact with the surface distinct from the input surface of the TD comprises the processor obtaining the PD contact signal in absence of the TD contact signal.

6. The method of claim 5, wherein the sensor is a force sensor configured to generate the PD contact signal when the PD applies a force to the input surface of the TD or to the surface distinct from the input surface of the TD.

7. The method of claim 1, wherein obtaining the toggling signal comprises obtaining the toggling signal from the PD.

8. The method of claim 7, wherein the PD generates the toggling signal in accordance with a user interaction with the PD.

9. The method of claim 8, wherein:
the PD includes an electromechanical switch, and
the user interaction with the PD includes a switching action to activate the electromechanical switch.

10. The method of claim 8, wherein:
the PD includes an inertial measurement unit, and
the user interaction with the PD includes a movement action of the pointing unit to activate the inertial measurement unit.

11. The method of claim 1, wherein:
the TD is a first TD;
the TDU comprises a second TD; and
when in the spaced apart mode, the visual element is on the first TD and the contact region is on the second TD.

12. A system, comprising:
a processing unit; and
a touch display (TD) having an input surface and being coupled to the processing unit, the system being configured to operate in a plurality of input modes each of which defining a distinct spatial relationship between a pointing device (PD) coupled to the system and visual element displayed on the TD,
the processing unit being configured to:
determine if the PD is in physical contact with the input surface of the TD or with a surface distinct from the input surface of the TD;
when the PD is in in physical contact with the input surface of the TD:
obtain a toggling signal to toggle from a first mode to a second mode, the first mode being one of:
an overlap mode where a contact region between the PD and the input surface of the TD overlaps the visual element; and
a spaced-apart mode where the image is spaced apart from the contact region and where the contact region and the visual element are non-overlapping, the second mode being the other of the overlap mode and the spaced-apart mode.

13. The system of claim 12, the processing unit being configured to, when the PD is in physical contact with the surface distinct from the input surface of the TD:
automatically select a third mode where a position and a movement of the PD on the surface distinct from the input surface of the TD is reproduced in a position and a movement of the visual element on the TDU.

14. The system of claim 12, wherein:
the TD is a capacitive TD and is configured to generate the TD contact signal when the PD is in contact with the input surface of the TD, and
the processing unit is configured to automatically determine the PD is in physical contact with the input surface of the TD when the processing unit obtains the TD contact signal.

15. The system of claim 14, wherein:
the system comprises the PD;
the PD has a sensor configured to generate a PD contact signal when the PD is in contact with the input surface of the TD or with the surface distinct from the input surface of the TD, and
the processing unit is configured to automatically determine the PD is in physical contact with the surface distinct from the input surface of the TD when the processor obtains the PD contact signal in absence of the TD contact signal.

16. The system of claim 15, wherein the sensor is a force sensor configured to generate the PD contact signal when the PD applies a force to the input surface of the TD or with the surface distinct from the input surface of the TD.

17. The system of claim 15, wherein the PD is configured to generate the toggling signal in accordance with a user interaction with the PD.

18. The system of claim 17, wherein:
the PD includes an electromechanical switch, and
the user interaction includes a switching action to activate the electromechanical switch.

19. The system of claim 17, wherein:
the PD includes an inertial measurement unit, and
the user interaction includes a movement action of the pointing unit to activate the inertial measurement unit.

20. The system of claim 12, wherein the visual element includes at least one of: a pixel, a group of pixels, a cursor, an icon, an arrow, a soft button, an image and a portion of a trace.

* * * * *